United States Patent
Kaneko

(10) Patent No.: US 11,593,788 B2
(45) Date of Patent: Feb. 28, 2023

(54) TRANSACTION PROCESSING SYSTEM, TRANSACTION PROCESSING DEVICE, AND INFORMATION PROCESSING METHOD

(71) Applicant: TOSHIBA TEC KABUSHIKI KAISHA, Tokyo (JP)

(72) Inventor: Tatsuya Kaneko, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 231 days.

(21) Appl. No.: 16/912,149

(22) Filed: Jun. 25, 2020

(65) Prior Publication Data
US 2021/0090064 A1 Mar. 25, 2021

(30) Foreign Application Priority Data
Sep. 19, 2019 (JP) .............................. JP2019-170838

(51) Int. Cl.
*G06Q 20/32* (2012.01)
*G06Q 20/08* (2012.01)
(Continued)

(52) U.S. Cl.
CPC ....... *G06Q 20/3274* (2013.01); *G06Q 20/085* (2013.01); *G06Q 20/202* (2013.01); *G06Q 20/208* (2013.01); *G06Q 30/0633* (2013.01)

(58) Field of Classification Search
CPC ............. G06Q 20/3274; G06Q 20/085; G06Q 20/202; G06Q 20/208; G06Q 30/0633
See application file for complete search history.

(56) References Cited

U.S. PATENT DOCUMENTS 7,386,509 B1 * 6/2008 Swift .................. G06Q 20/403
  705/39
8,556,164 B1 * 10/2013 Freedman .......... G06Q 30/0207
  235/487

(Continued)

FOREIGN PATENT DOCUMENTS

CN    110021125 A    7/2019
EP    2381409 A2 *  10/2011 ............. G06Q 20/20
(Continued)

OTHER PUBLICATIONS

M. Obaid, Z. Bayram and M. Saleh, "Instant Secure Mobile Payment Scheme," in IEEE Access, vol. 7, pp. 55669-55678, 2019, (Year: 2019).*

(Continued)

*Primary Examiner* — Asfand M Sheikh
(74) *Attorney, Agent, or Firm* — Kim & Stewart LLP

(57) ABSTRACT

A checkout system includes a mobile point-of-sale (POS) apparatus and a server. The mobile POS apparatus includes a code reader, a user interface, a display, a wireless communication interface, and a processor. The processor controls the wireless communication interface to transmit a product code read by the code reader and a settlement instruction based on a user operation on the user interface. The server is configured to generate a data record including the product code and transmit a settlement request to a settlement server upon receiving the settlement instruction. If a settlement non-completion response is received from the settlement server, the server stores transaction data including a first identifier indicating the settlement request and a second identifier indicating the transaction data in a database and causes the display of the mobile POS apparatus to display a code symbol representing the second identifier.

17 Claims, 15 Drawing Sheets

(51) Int. Cl.
*G06Q 20/20* (2012.01)
*G06Q 30/06* (2012.01)
*G06Q 30/0601* (2023.01)

(56) References Cited

U.S. PATENT DOCUMENTS

| | | | | |
|---|---|---|---|---|
| 10,515,363 B2* | 12/2019 | Quigley | ............ | G06Q 20/4012 |
| 2004/0254868 A1* | 12/2004 | Kirkland | ............ | G06Q 20/105 |
| | | | | 705/35 |
| 2011/0195748 A1* | 8/2011 | Main | ............ | G06Q 20/3263 |
| | | | | 715/764 |
| 2011/0309137 A1* | 12/2011 | Votaw | ............ | G07F 9/002 |
| | | | | 235/375 |
| 2012/0095853 A1* | 4/2012 | von Bose | ............ | G06Q 30/0641 |
| | | | | 705/16 |
| 2013/0054395 A1* | 2/2013 | Cyr | ............ | G06Q 20/3223 |
| | | | | 705/21 |
| 2013/0110654 A1* | 5/2013 | Kobres | ............ | G06Q 20/4014 |
| | | | | 705/16 |
| 2014/0052554 A1* | 2/2014 | Abraham | ............ | G06Q 30/0238 |
| | | | | 705/21 |
| 2014/0067678 A1* | 3/2014 | Lee | ............ | G06Q 20/326 |
| | | | | 705/44 |
| 2014/0129428 A1* | 5/2014 | Tyler | ............ | G06Q 20/3226 |
| | | | | 705/39 |
| 2014/0319210 A1* | 10/2014 | Angus | ............ | G07F 19/209 |
| | | | | 235/379 |
| 2015/0235198 A1* | 8/2015 | Liezenberg | ............ | H04W 12/068 |
| | | | | 455/418 |
| 2015/0339648 A1* | 11/2015 | Kushevsky | ............ | G06Q 20/32 |
| | | | | 705/21 |
| 2016/0110705 A1 | 4/2016 | Papper et al. | | |
| 2016/0328701 A1* | 11/2016 | Lee | ............ | G06K 7/1413 |
| 2018/0276638 A1 | 9/2018 | Gonda | | |
| 2019/0118844 A1 | 4/2019 | Li et al. | | |
| 2019/0349360 A1* | 11/2019 | Yeddula | ............ | H04L 63/0807 |
| 2021/0264402 A1* | 8/2021 | Kakinoki | ............ | G06K 7/1095 |

FOREIGN PATENT DOCUMENTS

EP   2381409 A2   10/2011
JP   5181786 B2   4/2013

OTHER PUBLICATIONS

Extended European Search Report dated Oct. 19, 2020, mailed in counterpart European Patent Application No. 20189511.7, 39 pages.

* cited by examiner

FIG. 16

| | | | | |
|---|---|---|---|---|
| A A A | | 1 PIECE | 120 YEN | CANCEL |
| B B B | | 2 PIECES | 460 YEN | CANCEL |
| ~~C C C~~ | | ~~0 PIECES~~ | ~~286 YEN~~ | |
| D D D | | 1 PIECE | 99 YEN | CANCEL |
| E E E | | 1 PIECE | 1,380 YEN | CANCEL |

TOTAL  5 PIECES         2,519 YEN

[COMMODITY WITHOUT BARCODE]  [PROCEED TO CHECKOUT]

Icon: SCO!

FIG. 17

PLEASE SELECT CHECKOUT METHOD.

[CHECKOUT WITH TERMINAL]   [CHECKOUT WITH CHECKOUT MACHINE]

TOTAL   2,519 YEN

[RETURN]

TRANSACTION PROCESSING SYSTEM, TRANSACTION PROCESSING DEVICE, AND INFORMATION PROCESSING METHOD

CROSS-REFERENCE TO RELATED APPLICATION

This application is based upon and claims the benefit of priority from Japanese Patent Application No. 2019-170838, filed on Sep. 19, 2019, the entire contents of which are incorporated herein by reference.

FIELD

Embodiments described herein relate generally to a transaction processing system, a transaction processing device, and an information processing method associated with transaction processing related to checkout systems with customer-operable, mobile point-of-sale apparatuses and the like.

BACKGROUND

A cart-based point-of-sale (POS) terminal for transaction processing system for registering details of a sales transaction is known. In such a cart-based POS system, a customer operates a mobile terminal to register products to be purchased.

In such a system, if an electronic settlement (payment) method, such as credit card settlement or barcode settlement, is used, the settlement processing can be completed at the mobile terminal by the customer. If the settlement can be completed in this way, the customer can easily complete the transaction without having to operate another device such as a stand-alone checkout device.

However, in some instances, the electronic settlement may be left in an "incomplete state" in which it is unknown whether or not the settlement has actually been completed. If the transaction is not completed, the processing at the mobile terminal for the transaction cannot be ended.

Under such circumstances, various measures are required to handle the incomplete transaction status.

DESCRIPTION OF THE DRAWINGS

FIG. 16 is a diagram illustrating an example of a registration screen according to an embodiment.

FIG. 17 is a diagram illustrating an example of a selection screen according to an embodiment.

DETAILED DESCRIPTION

The present disclosure is directed to providing a transaction processing system, a transaction processing device, and an information processing method that can cope with a case in which electronic settlement on a mobile terminal has not been completed.

In general, according to an embodiment, a checkout system includes a mobile point-of-sale (POS) apparatus and a server. The mobile POS apparatus includes a code reader, a user interface, a display, a wireless communication interface, and a processor. The processor is configured to control the wireless communication interface to transmit a product code read by the code reader and a settlement instruction based on a user operation on the user interface. The server is configured to generate a data record including the product code and transmit a settlement request to a settlement server upon receiving the settlement instruction from the mobile POS apparatus. When a settlement non-completion response is received from the settlement server, the server stores transaction data including a first identifier for the settlement request and a second identifier for the transaction data in a database and causes the display of the mobile POS apparatus to display a code symbol encoding or otherwise representing the second identifier.

Hereinafter, an example of an embodiment will be described with reference to drawings. The transaction processing system according to the present embodiment treats purchases and sales of commodities on display for sale at stores as a transaction to be processed.

Figure 1:
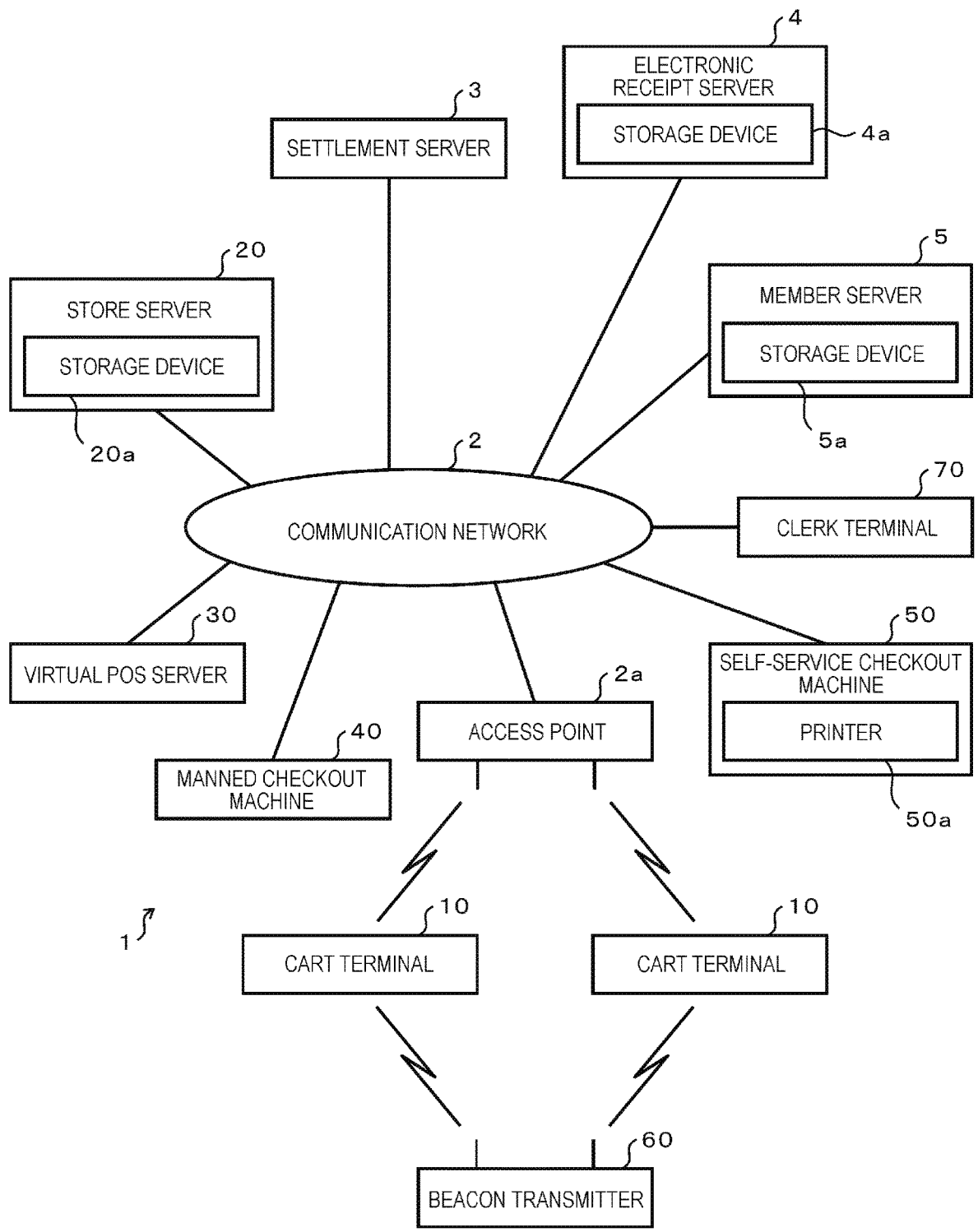
FIG. 1 is a schematic diagram illustrating a configuration of a transaction processing system according to an embodiment.
Figure 2:
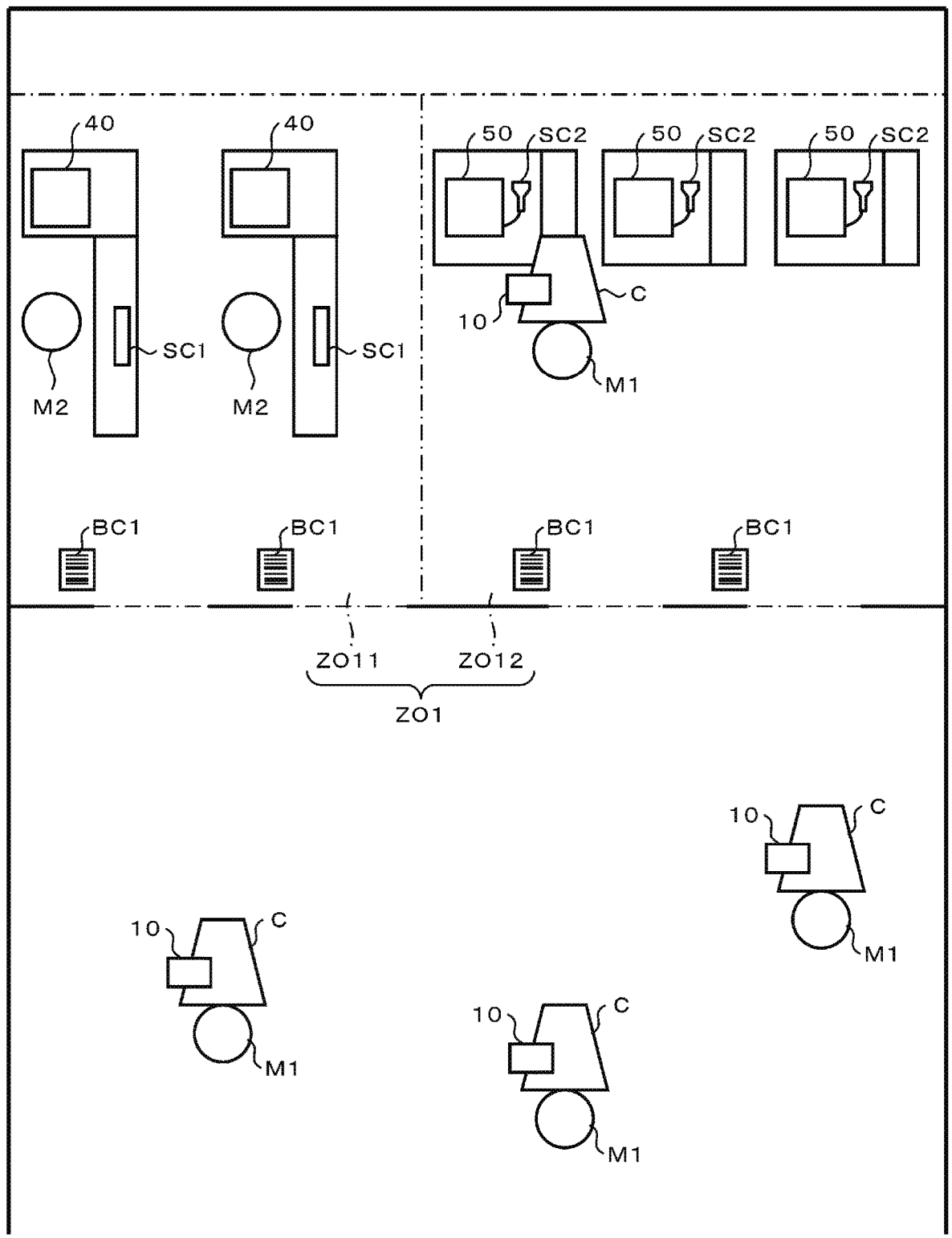
FIG. 2 is a schematic diagram illustrating a layout example of a store in which a transaction processing system according to an embodiment can be introduced.

FIG. 1 is a schematic diagram illustrating a configuration of a store system 1 according to an embodiment. FIG. 2 is a schematic diagram illustrating a layout example of a store in which the store system 1 is introduced.

As illustrated in FIG. 1, the store system 1 includes a cart terminal 10, a store server 20, a virtual POS server 30, a manned checkout machine 40, a self-service checkout machine 50, a beacon transmitter 60, and a clerk terminal 70.

The store system 1 may be referred to as a checkout system. The cart terminal 10 may also be referred to as mobile point-of-sale (POS) terminal or the like. In some examples, the cart terminal 10 may be a smartphone or the like. The cart terminal 10, the store server 20, the virtual POS server 30, the manned checkout machine 40, the self-service checkout machine 50, and the clerk terminal 70 can communicate with each other via a communication network 2. However, the cart terminal 10 is connected to the communication network 2 via an access point 2a by wireless communication with the access point 2a. It is desirable that the access point 2a is disposed so as to be able to communicate with any access point 2a from the cart terminal 10 located anywhere in the area of the store where customers are allowed to enter. The virtual POS server 30 can use a settlement service and an electronic receipt service provided by a settlement server 3 and an electronic receipt server 4 directly via the communication network 2 or via the store server 20. The virtual POS server 30 can refer to the member database managed by a member server 5 via the communication network 2. The settlement server 3 performs information processing for electronic settlement in response to a settlement request via the communication network 2. That is, the settlement server 3 is an example of a settlement device.

The store server 20, the virtual POS server 30, the manned checkout machine 40 or the self-service checkout machine 50 may be connected to the communication network 2 via the access point 2a by wireless communication with the access point 2a.

The communication network 2 transmits various types of data exchanged between connected devices. As the communication network 2, the Internet, a virtual private network (VPN), a local area network (LAN), a public communication network, a mobile communication network, or the like can be used alone or in an appropriate combination.

The electronic receipt server 4 includes a storage device 4a. The storage device 4a stores a contact database for providing an electronic receipt service.

Figure 3:
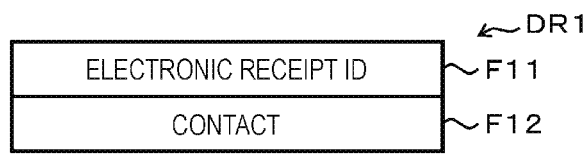
FIG. 3 is a schematic diagram illustrating a main data structure of a data record included in a contact database according to the embodiment.

FIG. 3 is a schematic diagram illustrating a main data structure of a data record DR1 included in the contact database.

The contact database is a set of data records DR1 associated with each of the users of the electronic receipt service. The data record DR1 includes fields F11 and F12.

An electronic receipt ID (identifier) as an identifier for identifying an associated user from other users is set in the field F11. In the field F12, contacts for various communications regarding the electronic receipt service to the associated user is set. The contact is, for example, an e-mail address.

The member server 5 includes a storage device 5a. The storage device 5a stores a member database for managing members of the service provided by the store system 1.

Figure 4:
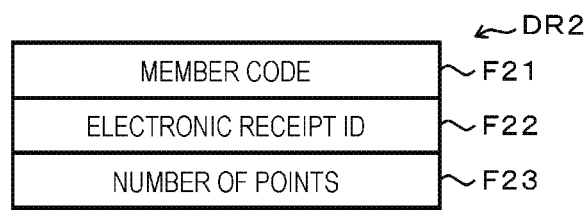
FIG. 4 is a schematic diagram illustrating aspects of a data record included in a member database managed by a member server according to an embodiment.

FIG. 4 is a schematic diagram illustrating a main data structure of a data record DR2 included in the member database managed by the member server 5.

The member database is a set of data records DR2 associated with each of the members. The data record DR2 includes fields F21, F22, and F23.

In the field F21, a member code as an identifier for identifying an associated member from other members is set. If the associated member is also a user of the electronic receipt service, an electronic receipt ID of the member is set in the field F22. If the associated member is not a user of the electronic receipt service, the field F22 is left blank, or predetermined invalid data is set. In the field F23, the number of points held by the associated member for a point redemption service is set.

The cart terminal 10 is an information processing terminal that functions as a user interface for an operation related to registration of a commodity. The cart terminal 10 is attached to, for example, a shopping cart (hereinafter, referred to as a cart) C as illustrated in FIG. 2. The cart terminal 10 may be referred to as a cart-mountable POS apparatus system. Then, the cart terminal 10 is operated by a customer M1 using the cart C. However, the cart terminal 10 may be carried by a customer. The store system 1 typically includes many cart terminals 10. The customer exclusively uses one cart terminal 10 while shopping. The cart terminal 10 may be fixed to the cart C or may be detachable from the cart C. When used by the customer M1, the cart terminal 10 is moved by the customer M1. That is, the cart terminal 10 is an example of a mobile terminal with which a customer can move.

The store server 20 executes information processing for supporting general store operations. The store server 20 includes a storage device 20a. The storage device 20a stores various databases including a commodity master database.

Figure 5:
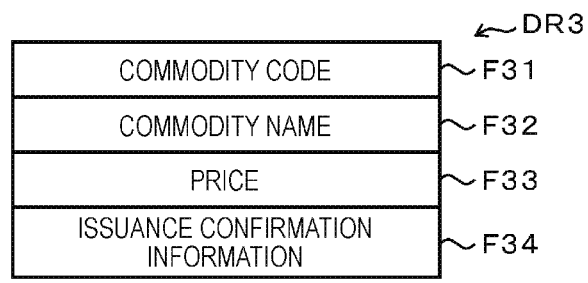
FIG. 5 is a schematic diagram illustrating aspects of a data record included in a commodity master database according to an embodiment.

FIG. 5 is a schematic diagram illustrating a main data structure of a data record DR3 included in the commodity master database.

The commodity master database is a set of data records DR3 that are individually associated with commodities that can be sold at the store. The data record DR3 includes fields F31, F32, F33, and F34.

In the field F31, a commodity code as an identifier for identifying an associated commodity from other commodities is set. In the field F32, a commodity name, which is a name prescribed so that humans can easily identify the associated commodity, is set. In the field F33, a price applied when selling the associated commodity to the customer is set. Issuance confirmation information is set in the field F34. The issuance confirmation information may include flag information indicating whether it is necessary to issue a certificate such as a discount voucher or a warranty when selling a commodity. The issuance confirmation information may include flag information indicating whether or not a clerk needs to respond, such as when selling alcohol, tobacco, certain medicines, and the like. For example, these pieces of flag information are set to if a clerk response/confirmation is not necessary, and are set to "1" if such a clerk response/confirmation is necessary. The issuance confirmation information may include the type of information that needs to be checked/certified. The issuance confirmation information may include identification information for identifying items to be confirmed by the clerk.

If the flag information indicating whether or not a certificate needs to be issued is "0", this indicates that there is no need to print out a certificate or the like. Therefore, the flag information indicates that there is no need to print out a certificate. Alcohol and tobacco are age-restricted commodities, and the response of the clerk when selling such a commodity is to check the age of the purchaser. If the flag information for an age check is "0", the flag information indicates that there is no age restriction.

The virtual POS server 30 executes information processing for achieving various functions, that would otherwise be accomplished by a physical-type POS terminal, in cooperation with the cart terminal 10. In the present embodiment, the cart terminal 10 often also functions as a user interface device. More specifically, the cart terminal 10 functions as a user interface for the virtual POS server 30. Then, the virtual POS server 30 and the cart terminal 10 cooperate with each other to execute information processing for performing various functions as the POS terminal so that the cart terminal 10 appears to the customer to function/operate as a POS terminal. A part of various functions as a POS terminal is processing information related to a sales transaction. The functions as the transaction processing system are performed by the cart terminal 10 and the virtual POS server 30.

The manned checkout machine 40 is a settlement terminal at which a clerk performs an operation related to the settlement of a commodity registered by the virtual POS server 30. Then, the manned checkout machine 40 executes accounting processing for determining the price of the registered commodity or commodities. Further, the manned checkout machine 40 executes settlement processing for settling the price determined by the above-described accounting processing under the operation of the clerk. The manned checkout machine 40 may also have a function of registering a commodity in accordance with an operation by the clerk, and further performing settlement processing of the registered commodity in accordance with an operation of the clerk. That is, the manned checkout machine 40 may have a function as a standard POS terminal of a face-to-face type (e.g., a store clerk-based checkout station).

As illustrated in FIG. 2, the manned checkout machine 40 is installed in a face-to-face zone 2011 of a checkout zone ZO1. For the manned checkout machine 40 in operation, a clerk M2 who operates the manned checkout machine 40 while engaging with the customer M1 face to face is assigned. A scanner SC1 is provided in the face-to-face zone 2011. The scanner SC1 is connected to the manned checkout machine 40. The scanner SC1 may be either a stationary type or a hand-held type. When a commodity that the customer M1 brought into the face-to-face zone ZO11 without registering with the cart terminal 10 is registered as a registered commodity, the scanner SC1 scans a code symbol such as a barcode or a two-dimensional data code indicated on the commodity under the operation of the clerk M2.

The self-service checkout machine 50 is a settlement terminal in which a customer performs an operation related to the settlement of a registered commodity registered by the virtual POS server 30. Then, the self-service checkout machine 50 executes accounting processing for determining a price related to the purchase and sale of the registered commodity. The self-service checkout machine 50 includes a printer 50a and issues a certificate such as a receipt by printing on a medium so that the customer can receive the certificate.

For this reason, the self-service checkout machine 50 is installed in a self-service zone 2012 of the checkout zone ZO1, as illustrated in FIG. 2. The clerk M2 who exclusively operates the self-service checkout machine 50 is not assigned for the self-service checkout machine 50.

In FIG. 2, two manned checkout machines 40 and three self-service checkout machines 50 are shown, but the number of the manned checkout machines 40 and the self-service checkout machines 50 is any other number depending on the circumstances of the store owner. The manned checkout machine 40 may not be provided. Each of the manned checkout machines 40 and the self-service checkout machines 50 may be referred to as an off-cart or a fixed POS station.

The beacon transmitter 60 transmits a predetermined beacon signal. A plurality of beacon transmitters 60 may be disposed. The number of the beacon transmitters 60 installed, installation locations, and the transmission intensity are adjusted to roughly cover the inside of the checkout zone ZO1 illustrated in FIG. 2.

The clerk terminal 70 is an information processing terminal that performs information processing for supporting work performed by the clerk M2. The clerk terminal 70 is, for example, a portable information terminal carried by the clerk M2 in charge of the maintenance of the cart C. The clerk terminal 70 is, for example, a monitoring terminal for monitoring the operation status of the store system 1. A plurality of clerk terminals 70 may be included in the store system 1. Then, in this case, the clerk terminal 70 may include a plurality of types.

Figure 6:
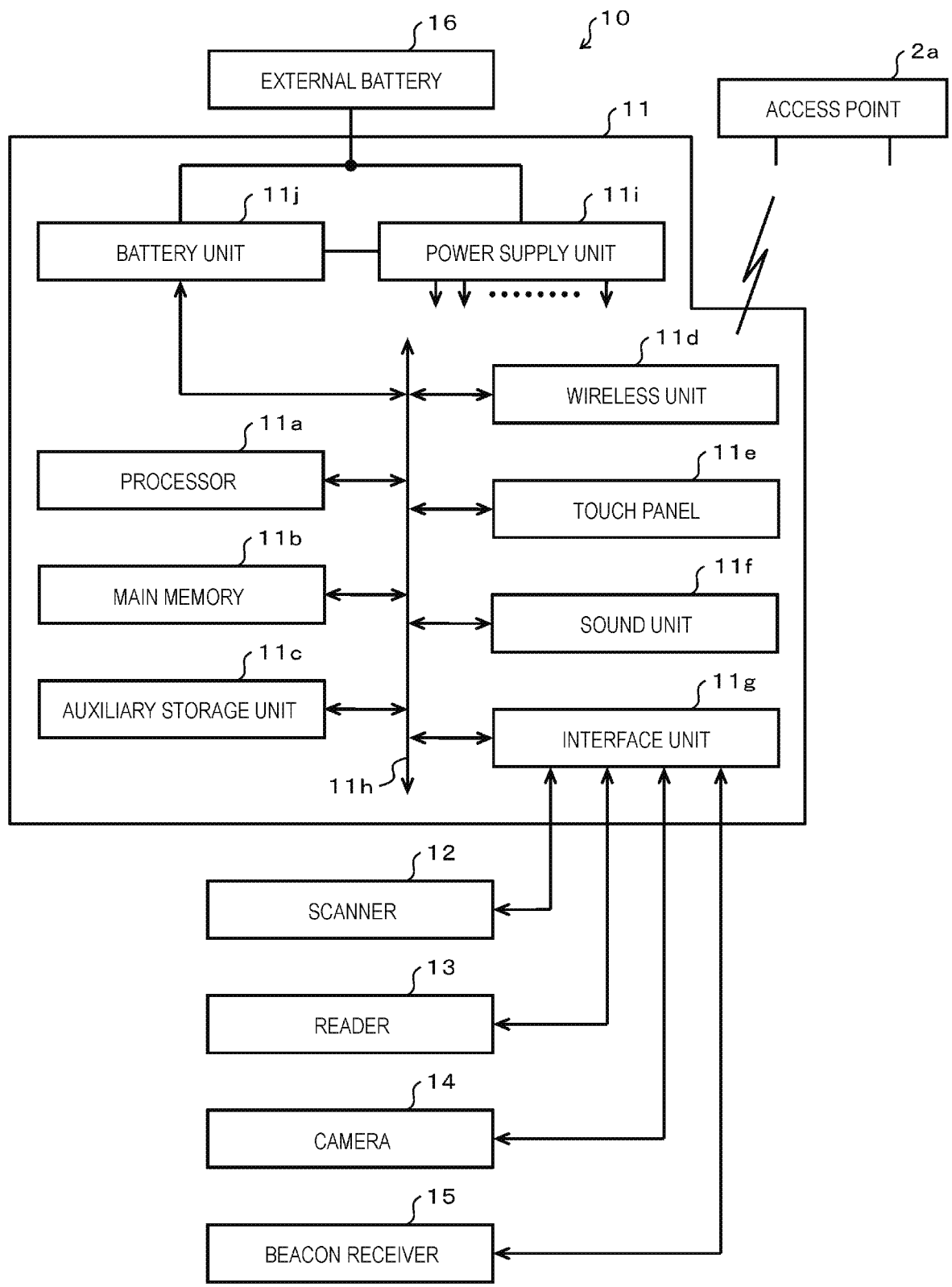
FIG. 6 is a block diagram of a cart terminal according to an embodiment.

FIG. 6 is a block diagram illustrating a main circuit configuration of the cart terminal 10.

The cart terminal 10 includes a tablet computer 11, a scanner 12, a reader 13, a camera 14, a beacon receiver 15, and an external battery 16.

The tablet computer 11 includes a processor 11a, a main memory 11b, an auxiliary storage unit 11c, a wireless unit 11d, a touch panel 11e, a sound unit 11f, an interface unit 11g, a transmission line 11h, a power supply unit 11i, and a battery unit 11j. The processor 11a, the main memory 11b, the auxiliary storage unit 11c, the wireless unit 11d, the touch panel 11e, the sound unit 11f, and the interface unit 11g can communicate with each other via the transmission line 11h. The computer for controlling the cart terminal 10 is configured by connecting the processor 11a, the main memory lib, and the auxiliary storage unit 11c via the transmission line 11h.

The processor 11a corresponds to a central part of the computer. The processor 11a executes information processing for performing various functions as the cart terminal 10 according to an information processing program such as an operating system and an application program. The processor 11a is, for example, a central processing unit (CPU).

The main memory lib corresponds to a main storage part of the computer. The main memory lib includes a nonvolatile memory area and a volatile memory area. The main memory lib stores the above information processing program in a nonvolatile memory area. The main memory lib may store data necessary for the processor 11a to execute information processing in the nonvolatile or volatile memory area. The main memory 11b uses the volatile memory area as a work area in which data is appropriately rewritten by the processor 11a. The nonvolatile memory area is, for example, a read-only memory (ROM). The volatile memory area is, for example, a random access memory (RAM).

The auxiliary storage unit 11c corresponds to an auxiliary storage part of the computer. As the auxiliary storage unit 11c, for example, a storage unit using a known storage device such as an electrically erasable programmable read-only memory (EEPROM), a hard disc drive (HDD), or a solid-state drive (SSD) can be used. The auxiliary storage unit 11c stores data used when the processor 11a performs various kinds of processing, data created by the processing of the processor 11a, and the like. The auxiliary storage unit 11c may store the information processing program described above.

The wireless unit 11d exchanges data with the access point 2a by wireless communication according to a wireless communication protocol. The wireless unit 11d may be referred to as a wireless communication interface.

The touch panel 11e includes a display device and a touch sensor. The display device displays any screen such as a graphical user interface (GUI) screen under the control of the processor 11a. As the display device, a known device such as a color liquid crystal display (LCD) can be used. The touch sensor is disposed so as to overlap with the display surface of the display device. The touch sensor detects a touch position of an operator on the display surface of the display device and sends the position information to the processor 11a. A well-known device can be used as the touch sensor.

The sound unit 11f outputs various sounds such as voice and melody.

The scanner 12, the reader 13, the camera 14, and the beacon receiver 15 are connected to the interface unit 11g. The interface unit 11g interfaces between the scanner 12, the reader 13, the camera 14, the beacon receiver 15, and the processor 11a to exchange data. An existing Universal Serial Bus (USB) controller or the like can be used as the interface unit 11g.

The transmission line 11h includes an address bus, a data bus, a control signal line, and the like, and transmits data and control signals exchanged between the processor 11a, the main memory lib, the auxiliary storage unit 11c, the wireless unit 11d, the touch panel 11e, and the interface unit 11g.

The power supply unit 11i receives power from the battery unit 11j or the external battery 16 and supplies operating power to electrical elements in the tablet computer 11. The power supply unit 11i consumes power supplied from the external battery 16 when power is supplied from the external battery 16 and consumes power supplied from the battery unit 11j when power is not supplied from the external battery 16.

The battery unit 11j is charged by power supply from the external battery 16. When power is not supplied from the external battery 16, the battery unit 11j supplies charged power to the power supply unit 11i. The battery unit 11j has a function of measuring the own remaining battery level.

The scanner 12 reads a code symbol such as a barcode or a two-dimensional data code. The scanner 12 is mainly used for reading a code symbol shown on a commodity and representing (encoding) a commodity code or the like of the commodity. The scanner 12 may be used to read a code symbol indicating a member code or the like, which is shown on a membership card or displayed on a mobile terminal. The scanner 12 outputs data represented by the read code symbol. The scanner 12 may be a type that reads a code symbol by scanning with a laser beam, or may be a type that reads a code symbol from an image captured by an imaging device. In an embodiment, the scanner 12 may be referred to as a code reader.

The reader 13 reads and outputs data recorded on a recording medium. The reader 13 is a magnetic card reader when the recording medium is a magnetic card, and is an IC card reader when the recording medium is a contact type IC card. In the case of a recording medium using radio frequency identification (RFID) such as a non-contact type IC card or a smartphone, an RFID reader is used as the reader 13.

The camera 14 takes an overhead view of the inside of the shopping cart placed on the cart C. Then, the camera 14 outputs image data corresponding to the captured image. The tablet computer 11, the scanner 12, the reader 13, and the camera 14 may be an example of a user interface.

The beacon receiver 15 receives the beacon signal transmitted by the beacon transmitter 60. Then, when the beacon signal can be received, the beacon receiver 15 outputs notification data for notifying the processor 11a of the fact.

The external battery 16 is detachable from the tablet computer 11. When attached to the tablet computer 11, the external battery 16 supplies the stored power to the tablet computer 11.

Figure 7:
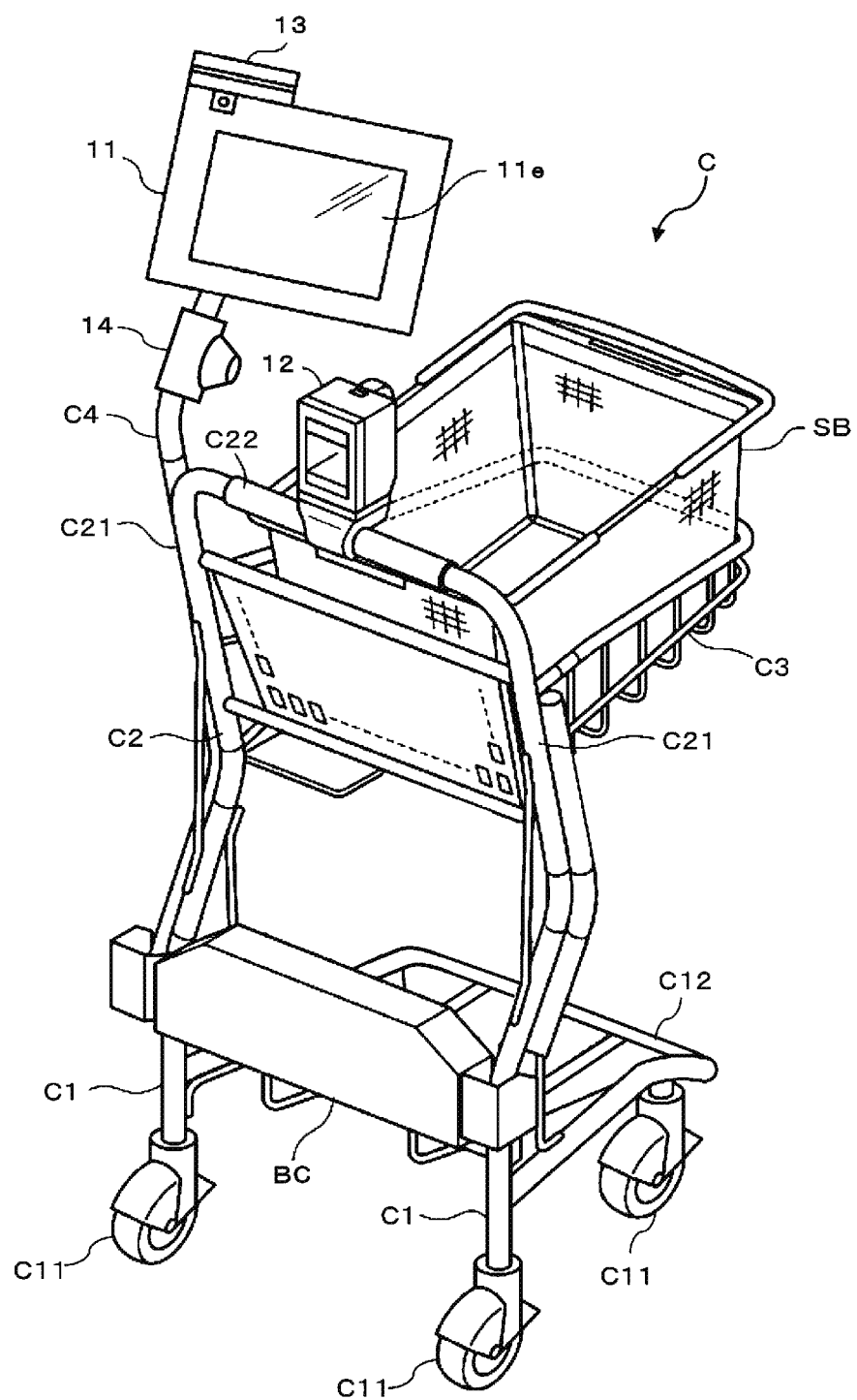
FIG. 7 illustrates a perspective view of an example of a cart according to an embodiment.

FIG. 7 illustrates a perspective view of an example of the cart C.

The cart C includes a caster portion C1, a handle frame portion C2, and a basket receiving portion C3.

The caster unit C1 has four wheels C11 for moving the cart C smoothly on the floor. The wheel C11 is attached to the frame C12 so as to be rotatable around a vertical axis.

The handle frame portion C2 includes a pair of vertical frames C21 and C21 and a handle bar C22. The vertical frames C21 and C21 are erected above the two wheels of the caster portion C1. The handle bar C22 connects the upper ends of the vertical frames C21 and C21.

The basket receiving portion C3 is provided horizontally from a middle portion of the handle frame portion C2. The basket receiving unit C3 holds a shopping basket SB for containing commodities. The caster unit C1 also holds the shopping basket SB thereon.

The customer M1 who uses the cart C is typically located on the near side in FIG. 7 with respect to the handle frame portion C2. Then, the customer M1 pushes the cart C while holding the handle bar C22. That is, in this case, the direction in which the basket receiving portion C3 protrudes from the handle frame portion C2 is the forward direction of the cart C.

The scanner 12 is mounted in the middle of the handle bar C22. A pole C4 is attached to one of the vertical frames C21 such that the tip thereof is located above the handle bar C22. The tablet computer 11 described above is attached to the tip of the pole C4 such that the screen of the touch panel 11e faces the opposite side of the forward direction. The camera 14 is mounted in the middle of the pole C4 so as to face the shopping basket SB held by the basket receiving portion C3. Further, the reader 13 is attached to the tablet computer 11. In FIG. 7, the reader 13 is a magnetic card reader. In the reader 13, the card slit is oriented in the same direction as the screen of the touch panel 11e. At the lower end of the handle frame C2, a battery case BC is mounted between the vertical frames C21 and C21. The battery case BC houses the external battery 16.

Figure 8:
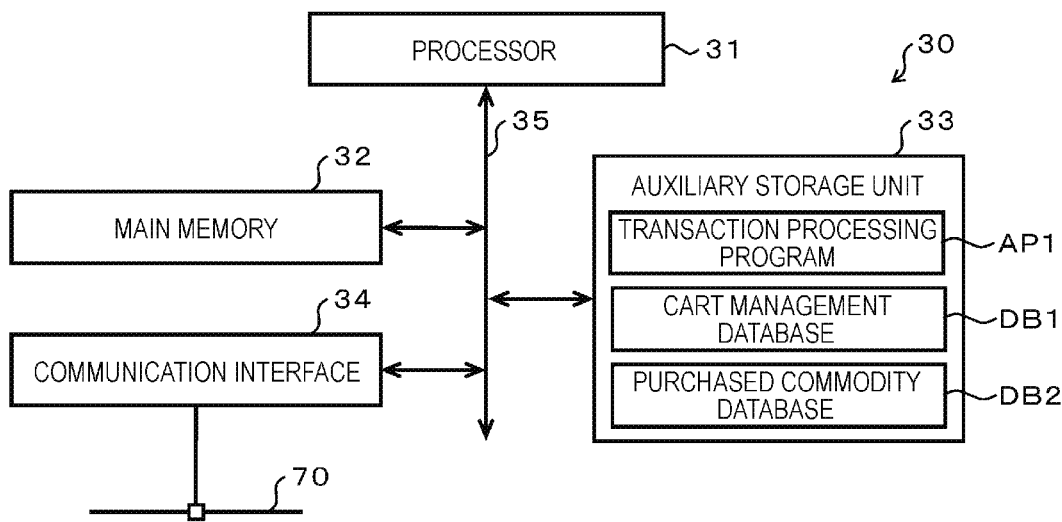
FIG. 8 is a block diagram depicting aspects of a virtual POS server according to the embodiment.

FIG. 8 is a block diagram illustrating a main circuit configuration of the virtual POS server 30.

The virtual POS server 30 includes a processor 31, a main memory 32, an auxiliary storage unit 33, a communication interface 34, and a transmission line 35. The processor 31, the main memory 32, the auxiliary storage unit 33, and the communication interface 34 can communicate with each other via the transmission line 35. A computer for controlling the virtual POS server 30 is configured by connecting the processor 31, the main memory 32, and the auxiliary storage unit 33 by the transmission line 35. The outline of the functions of the processor 31, the main memory 32, the auxiliary storage unit 33, and the transmission line 35 are the same as those of the processor 11a, the main memory 11b, the auxiliary storage unit 11c, and the transmission line 11h, and thus the description thereof will be omitted.

The communication interface 34 performs data communication with each unit connected to the communication network 2 according to a predetermined communication protocol.

The auxiliary storage unit 33 stores a transaction processing program AP1, which is one of the information processing programs. The transaction processing program AP1 is an application program, and describes sales processing described later. A part of the storage area of the auxiliary storage unit 33 is used as a cart management database DB1 and a registered commodity database DB2.

Figure 9:
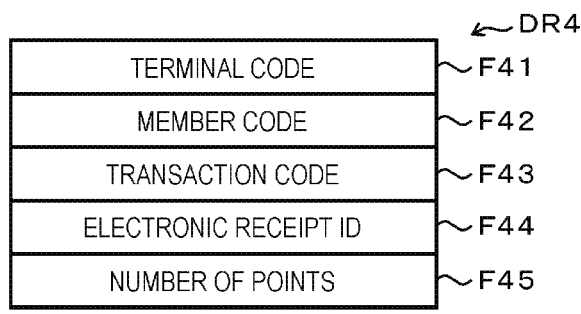
FIG. 9 is a schematic diagram aspects of a data record included in a cart management database according to an embodiment.

FIG. 9 is a schematic diagram illustrating a main data structure of a data record DR4 included in the cart management database DB1.

The cart management database DB1 is a set of data records DR4 associated with each of the carts C used by the customer M1. The data record DR4 includes fields F41, F42, F43, F44, and F45.

In the field F41, a terminal code for identifying the cart terminal 10 attached to the associated cart C from other cart terminals 10 is set. In the field F42, a member code for identifying the customer M1 using the associated cart C from other customers is set. In the field F43, a transaction code for identifying a transaction performed by using the associated cart C from other transactions is set. In the field F44, the electronic receipt ID of the customer M1 using the associated cart C is set. In the field F45, the number of points held by the customer M1 using the associated cart C is set. The data record DR4 may include another field in which data different from the fields F41 to F45 is set.

Figure 10:
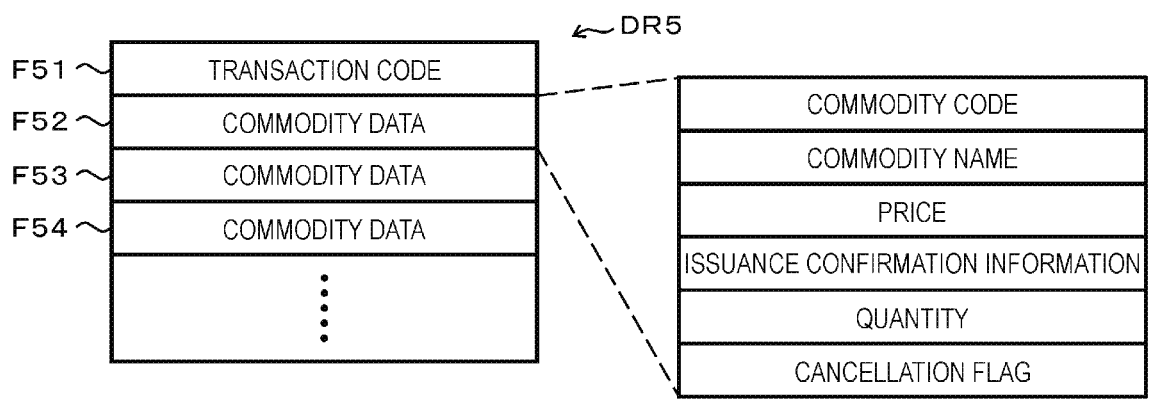
FIG. 10 is a schematic diagram illustrating aspects of a data record included in a registered commodity database according to an embodiment.

FIG. 10 is a schematic diagram illustrating a main data structure of a data record DR5 included in the registered commodity database DB2.

The registered commodity database DB2 is a set of data records DR5 associated with each of the shopping being executed in the store. The data record DR5 includes fields F51 and F52. The data record DR5 may also include fields F53, F54, . . . .

In the field F51, a transaction code prescribed for an associated shopping is set. This transaction code is the same as the transaction code set in the field F42 of the data record DR4 associated with the cart C used for the associated shopping. In the field F52, commodity data related to a commodity registered as a registered commodity for the associated shopping is set. The commodity data includes a commodity code, a unit price, a commodity name, a quantity, and a cancellation flag. The commodity code is an identification code prescribed for identifying a commodity for each stock keeping unit (SKU), and for example, a Japanese article number (JAN) code is used. The cancellation flag is flag data for specifying a commodity that has been once registered as a registered commodity but has been subsequently canceled.

The data record DR5 includes fields subsequent to the field F53 when two or more commodities have been registered for the associated shopping. Then, the commodity data is set in the fields subsequent to the field F53 as in the field F52. Each field after the field F52 represents a list of registered commodities for the associated shopping. This list of registered commodities is hereinafter referred to as a commodity list or a product list.

As the hardware of the virtual POS server 30, for example, a general-purpose network server can be used. The transfer of the virtual POS server 30 is generally performed in a state where the transaction processing program AP1 is stored in the auxiliary storage unit 33 and the cart management database DB1 and the registered commodity database DB2 are not stored. However, the hardware in a state where the transaction processing program AP1 is not stored in the auxiliary storage unit 33, or the hardware in a state where the same type of another version of the transaction processing program AP1 is stored in the auxiliary storage unit 33, and the transaction processing program AP1 may individually be transferred. Then, the virtual POS server 30 may be configured by writing the transaction processing program AP1 into the auxiliary storage unit 33 in response to the operation of any worker. The transaction processing program AP1 can be transferred by being recorded on a removable recording medium such as a magnetic disk, a magneto-optical disk, an optical disk, or a semiconductor memory, or by communication via a network. The cart management database DB1 and the registered commodity database DB2 are configured in the auxiliary storage unit 33 when the processor 31 executes information processing based on the transaction processing program AP1. At least a part of the transaction processing program AP1, the cart management database DB1, and the registered commodity database DB2 may be stored in the main memory 32.

Next, the operation of the store system 1 configured as described above will be described with reference to FIGS. 11, 12, 13, 14, and 15. The contents of the various kinds of processing described below are merely examples, and the order of some processing may be changed, some processing may be omitted, or another processing may be added as appropriate.

When the cart terminal 10 is activated, the processor 11a executes information processing described below according to an information processing program stored in the main memory 11b or the auxiliary storage unit 11c.

Figure 11:
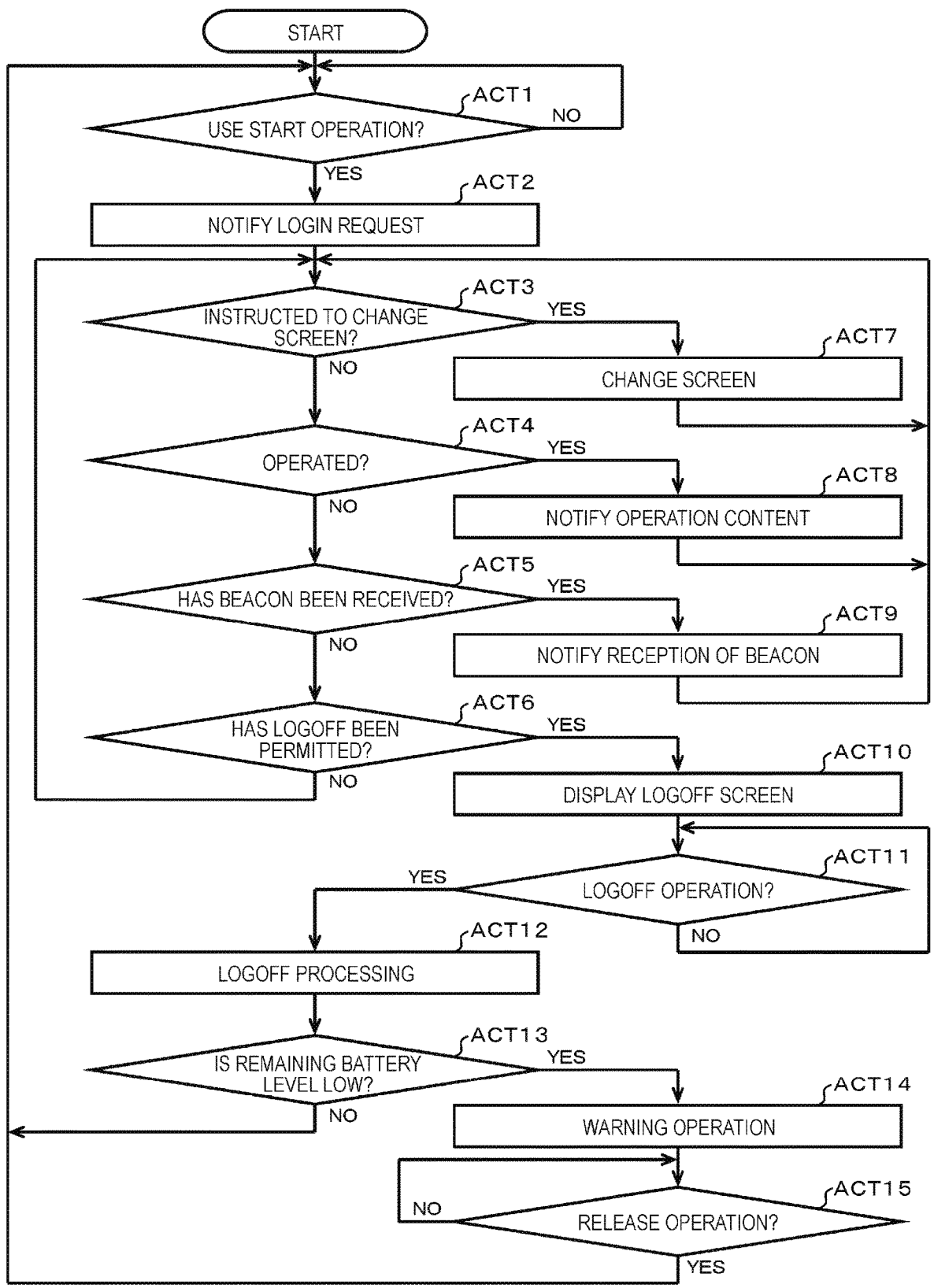
FIG. 11 is a flowchart illustrating aspects of information processing executed by a processor of a cart terminal according to an embodiment.

FIG. 11 is a flowchart illustrating a procedure of information processing executed by the processor 11a in the cart terminal 10.

(Start Using Cart C)

As ACT 1, the processor 11a waits for a use start operation to be performed. At this time, the processor 11a is in a state of waiting for the start of shopping by using the cart C of an installation destination. For example, in this standby state, the processor 11a displays a screen presenting a start button on the touch panel 11e. The customer M1 takes out one of the carts C placed in the cart storage area and performs a predetermined operation for starting use on the cart terminal 10 attached to the cart C. If the customer M1 is a member, the customer M1 causes the scanner 12 or the reader 13 to read the member code recorded on the member card. If the customer M1 is not a member, the customer operates the start button described above. Then, when these operations are performed, the processor 11a determines that the operation for starting use has been performed and determines YES, and the process proceeds to ACT 2.

As ACT 2, the processor 11a notifies the virtual POS server 30 of the terminal code and the member code of the cart terminal 10 in which the processor 11a is mounted. This is a login request notification. When the start button is touched, the processor 11a notifies the virtual POS server 30 of a member code predetermined for non-members. The member code for a non-member may be common to a plurality of customers or may be different. Specifically, the processor 11a transmits the notification data including the terminal code and the member code from the wireless unit 11d to the access point 2a addressed to the virtual POS server 30. This notification data is transmitted to the virtual POS server 30 by the access point 2a and the communication network 2. Then, the communication interface 34 of the virtual POS server 30 receives the notification data. The communication interface 34 supplies the received notification data to the processor 31. In this way, the processor 31 is notified of the login request. In the following description of another notification, the detailed description as described above will be omitted.

When the processor 31 receives the notification of the login request, the processor 31 starts information processing for transaction processing as described below. The processor executes the information processing according to the transaction processing program AP1.

FIGS. 12, 13, 14 and 15 are flowcharts illustrating the procedure of information processing for transaction processing by the processor 31.

The processor 31 starts this information processing every time the processor 31 receives a login request notification and executes a plurality of pieces of information processing in parallel. That is, the processor 31 executes the following information processing in parallel for each of a plurality of cart terminals 10. Hereinafter, information processing for one cart terminal 10 that has notified the login as described above will be described. When simply referred to as "cart terminal 10", it refers to one cart terminal 10 that is a target. When simply referred to as "customer M1", it refers to the customer M1 using one cart terminal 10 as the target.

Figure 12:
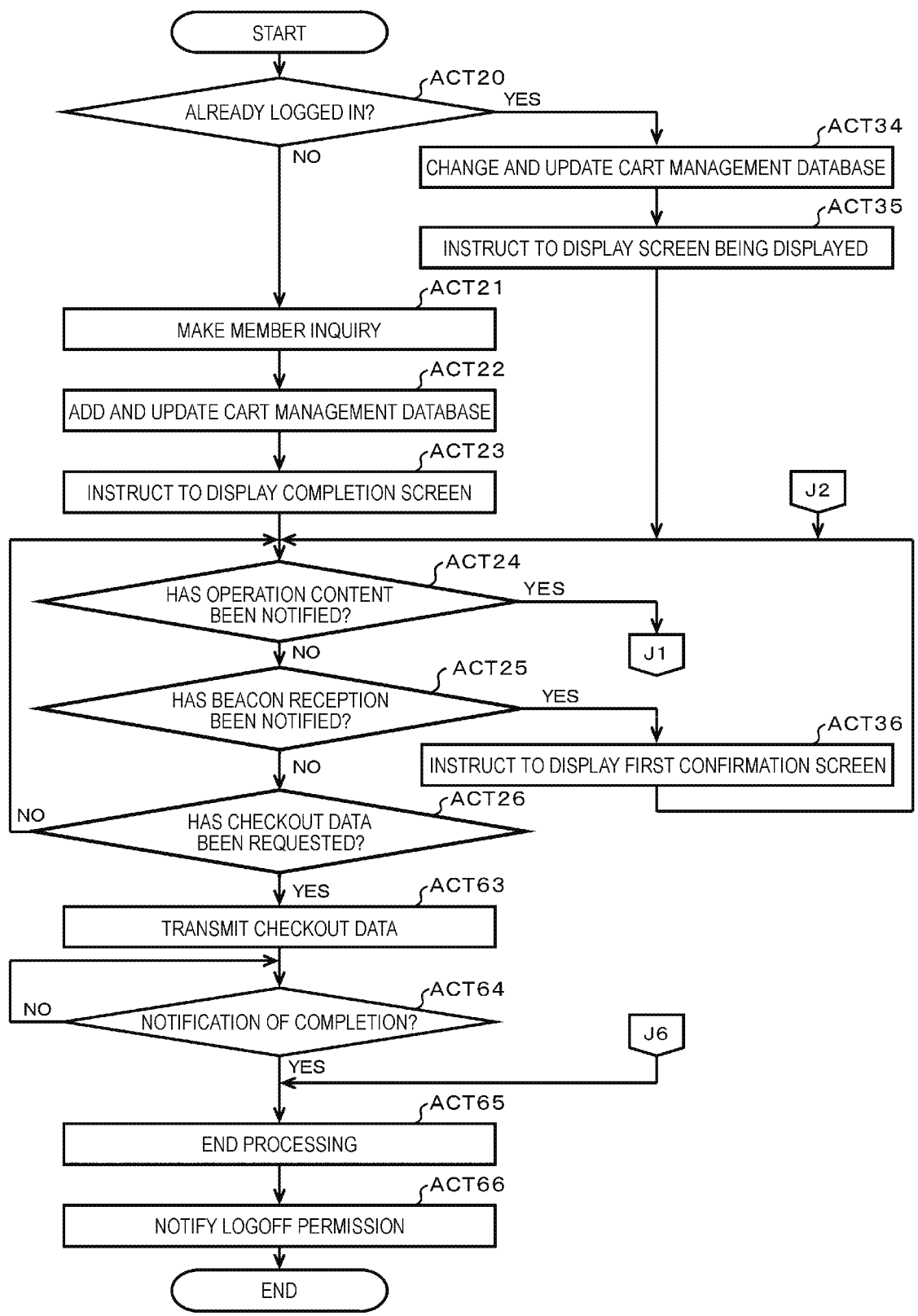
FIGS. 12-15 are flowcharts illustrating aspects of information processing for transaction processing by a processor of a virtual POS server according to an embodiment.

As ACT 20 in FIG. 12, the processor 31 determines whether or not the member who has requested login is already logged in. For example, if the member code included in the login request notification data is not for a non-member and does not match any of the member codes set in the field F42 of the data record DR4 included in the cart management database DB1, the processor 31 determines that the member is not logged in. The processor 31 determines that the user is not logged in even when the member code included in the login request notification data is for a non-member. Then, the processor 31 determines NO if the user is not logged in and the process proceeds to ACT 21.

As ACT 21, the processor 31 makes a member inquiry to the member server 5. The processor 31 makes an inquiry to the member server 5, for example, along with the notification of the member code included in the notification data of the login request. The member server 5 finds the data record DR2 in which the member code set in the field F21 matches the notified member code, from the data records DR2 included in the member database. Then, the member server 5 notifies the virtual POS server 30 of the electronic receipt ID and the number of points set in the fields F22 and F23 of the data record DR2.

As ACT 22, the processor 31 updates the cart management database DB1 to add a new data record DR4. The processor 31 sets the terminal code and the member code included in the notification data in the fields F41 and F42 for the data record DR4 to be added here. The processor 31 determines a transaction code by a predetermined algorithm so as to be different from the transaction code used in the transaction processing for at least another cart terminal 10. Then, the transaction code is set in the field F43 of the additional data record DR4. In addition, the processor 31 sets the electronic receipt ID and the number of points notified from the member server 5 as described above in the fields F44 and F45 of the additional data record DR4, respectively. If the electronic receipt ID notified from the member server 5 is not notified, the processor 31 sets the field F44 of the additional data record DR4 to a blank state or sets predetermined invalid data. Then, when the update is completed, the processor 31 notifies the cart terminal 10 of the completion of the login.

As ACT 23, the processor 31 instructs the cart terminal 10 to display a completion screen. The completion screen is a screen for notifying the customer that the login has been completed. The completion screen may indicate guidance for the customer such as that registration of a commodity may be started. The processor 31 transmits, for example, instruction data including screen data corresponding to the completion screen to the cart terminal 10 from the communication interface 34. This instruction data is transmitted to the cart terminal 10 by the communication network 2 and the access point 2a. Then, the wireless unit 11d of the cart terminal 10 receives the instruction data. The wireless unit 11d gives the received instruction data to the processor 11a. This instructs the processor 11a to display a completion screen. Various instructions from the virtual POS server 30 to the cart terminal 10 are performed in the same manner as the above-described display instruction of the completion screen. Therefore, in the following description of another instruction, the detailed description as described above will be omitted.

(Registration of Commodity)

After notifying the login request at ACT 2 in FIG. 11, the processor 11a in the cart terminal 10 waits for the notification of the login completion from the virtual POS server 30 and the process proceeds to ACT 3.

As ACT 3, the processor 11a determines whether or not a screen change has been instructed from the virtual POS server 30 as described later. Then, if it is not determined that the instruction has been issued, the processor 11a determines NO and the process proceeds to ACT 4.

As ACT 4, the processor 11a determines whether or not any operation has been performed by the operator. The operator is usually the customer M1, but the clerk M2 may temporarily become the operator. Then, if it is not determined that the operation has been performed, the processor 11a determines NO and the process proceeds to ACT 5.

As ACT 5, the processor 11a determines whether or not a beacon signal has been received. If it is not determined that the reception of the beacon signal from the beacon receiver 15 has been notified, the determination is NO and the process proceeds to ACT 6.

As ACT 6, the processor 11a determines whether or not logoff from the virtual POS server 30 has been permitted. Then, if it is not determined that the permission has been given, the processor 11a determines NO and the process returns to ACT 3.

In ACT 3 to ACT 6, the processor 11a waits for an instruction to change the screen, an operation, reception of a beacon signal, or permission to log off.

When various display instructions such as the above-described display instruction of the completion screen are issued, the processor 11a determines YES in ACTS and the process proceeds to ACT 7.

As ACT 7, the processor 11a changes the display screen on the touch panel 11e according to the display instruction. The processor 11a controls the touch panel 11e to display a screen represented by the screen data included in the instruction data, for example. If the screen data included in the instruction data represents the above-described completion screen, the display screen of the touch panel 11e is changed to the completion screen. Thereby, the customer M1 is able to know that the operation for registering a commodity may be started. After that, the processor 11a returns to the standby state of ACT 3 to ACT 6.

The customer M1 moves in the store while searching for a commodity to be registered while pressing the cart C. Then, when a commodity to be registered is found, the commodity is taken out of the display area and placed in the cart C. At this time, the customer M1 performs an operation for specifying the corresponding commodity as a registered commodity. The operation is, for example, an operation of the scanner 12 for reading the code symbol displayed on the corresponding commodity. The above operation is, for example, an operation of the touch panel 11e for specifying the corresponding commodity. When registering a plurality of commodities having the same commodity code as registered commodities, the customer M1 may perform an operation of specifying the number of the commodities and then cause the scanner 12 to read the code symbol only once.

If any operation including such an operation is performed by the operator, the processor 11a determines YES in ACT 4 and the process proceeds to ACT 8.

As ACT 8, the processor 11a notifies the processor 31 of the virtual POS server 30 of the operation content. When an operation of the scanner 12 for reading the code symbol displayed on the commodity is performed, the processor 11a acquires the code symbol data read by the scanner 12 from the scanner 12. The code symbol data includes a commodity code for identifying a commodity. When an operation is performed on the touch panel 11e for specifying a commodity, the processor 11a acquires a commodity code related to the commodity specified by the operation by referring to, for example, a data table. The data table represents the commodity code in association with the content of the operation and is stored in advance, for example, in the auxiliary storage unit 11c. That is, the processor 11a acquires the commodity code therefrom and has a function as an acquisition unit. When notifying an operation for specifying a commodity as a registered commodity, the processor 11a notifies the commodity code and the number of the specified commodities. The processors 11a notifies "1" when the operation of specifying the number of commodities is not performed. Then, the processor 11a thereafter returns to the standby state of ACT 3 to ACT 6.

In the virtual POS server 30, the processor 31 determines whether or not the operation content has been notified as ACT 24 in FIG. 12. Then, if it is not determined that the corresponding notification has been made, the processor 31 determines NO and the process proceeds to ACT 25.

As ACT 25, the processor 31 determines whether or not the reception of the beacon signal has been notified. Then, if it is not determined that the corresponding notification has been made, the processor 31 determines NO and the process proceeds to ACT 26.

As ACT 26, the processor 31 determines whether or not checkout data has been requested. If it is not determined that the corresponding request has been made, the processor 31 determines NO and the process returns to ACT 24.

In ACT 24 to ACT 26, the processor 31 waits for any of the notification of the operation content, the notification of the beacon reception, and the request for the checkout data.

Figure 13:
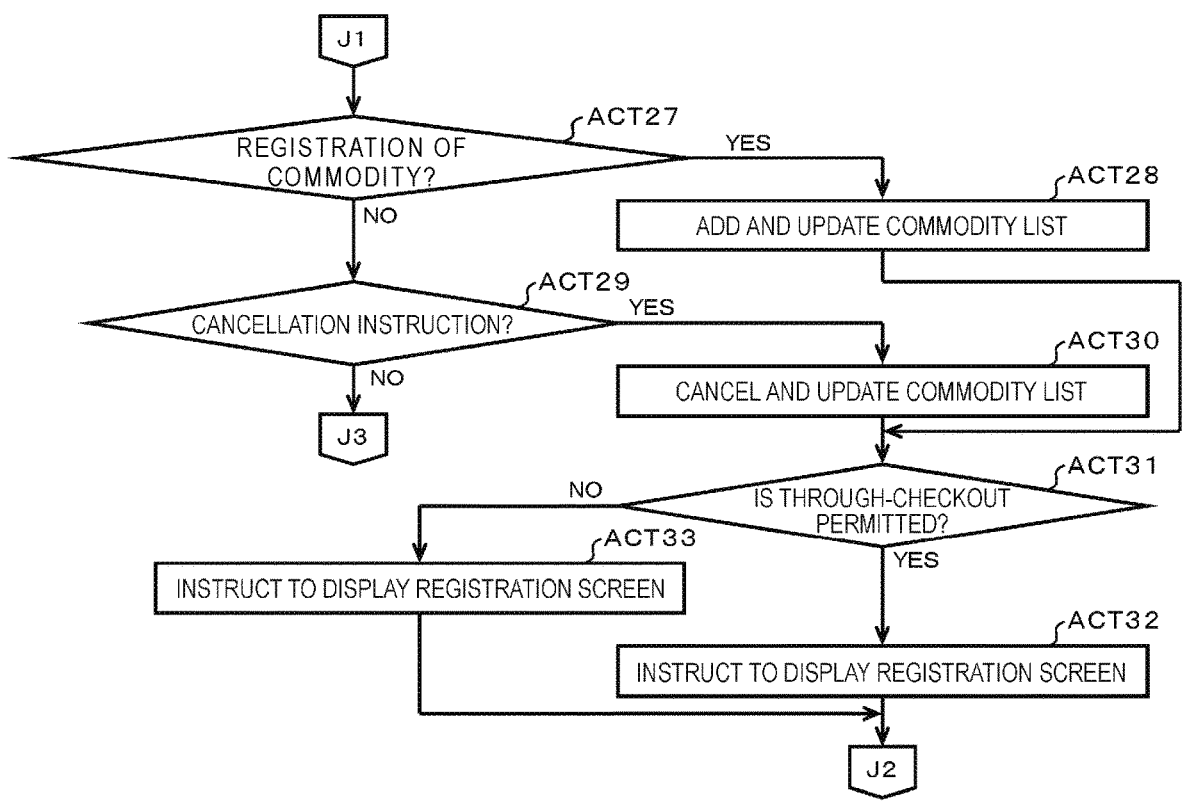

When the operation content is notified as described above, the processor 31 determines YES in ACT 24 and the process proceeds to ACT 27 in FIG. 13.

As ACT 27, the processor 31 determines whether or not the notified operation content is the specification of a registered commodity. Then, if the operation content is the specification of the registered commodity, the processor 31 determines YES and the process proceeds to ACT 28.

As ACT 28, the processor 31 updates the commodity list so as to add the specified registered commodity. For example, the processor 31 finds the data record DR4 in which the terminal code set in the field F41 matches the terminal code of the cart terminal 10 from the data records DR4 included in the cart management database DB1. Then, the processor 31 acquires the transaction code set in the field F43 of the corresponding data record DR4. Next, the processor 31 finds the data record DR5 in which the transaction code set in the field F51 matches the acquired transaction code from the data records DR5 included in the registered commodity database DB2. If there is no corresponding data record DR5, the processor 31 sets the acquired transaction code in the field F51 and adds a new data record DR5 in which the commodity data including the commodity code of the specified registered commodity is set in the field F52 to the registered commodity database DB2. If the corresponding data record DR5 is found, the processor 31 adds a new field next to the field located at the end of the corresponding data record DR5 and sets commodity data including the commodity code of the specified registered commodity in this field. The processor 31 sets the cancellation flag of the newly set commodity data to a state indicating that the cancellation has not been performed. The processor 31 includes, in the commodity data to be set in the field F52 or the new field, the commodity name, the price and the issuance confirmation information acquired from the commodity master database of the store server 20 by using the commodity code as a key, and the number of commodities notified together with the commodity code from the cart terminal 10.

If the customer M1 wants to cancel the purchase of the commodity registered as described above, the customer M1 performs an operation for instructing cancellation of the commodity on the touch panel 11e, for example. Then, when the content of this operation is notified from the cart terminal 10 to the virtual POS server 30, the processor 31 determines NO in ACT 27 and the process proceeds to ACT 29.

As ACT 29, the processor 31 determines whether or not the notified operation content is a cancellation instruction. Then, if the instruction is the cancellation as described above, the determination is YES, and the process proceeds to ACT 30.

As ACT 30, the processor 31 updates the commodity list so as to exclude the registered commodity instructed to be canceled. For example, the processor 31 changes the cancellation flag included in the commodity data regarding the registered commodity specified to be canceled to a state indicating that the cancellation has been performed.

In ACT 28 or ACT 30, the processor 31 calculates the total price of the registered commodity based on the commodity data included in the updated commodity list. In calculating the total price, the processor 31 applies various kinds of well-known price-cut processing or discount processing as necessary.

After completing ACT 28 or ACT 30, the process proceeds to ACT 31 in either case.

As ACT 31, the processor 31 determines whether or not the state is one for which so called "through-checkout" is permitted. Here, "through-checkout" refers to performance of checkout (transaction finalization) by a customer/operator procedure at the cart terminal 10 without requiring the use of the manned checkout machine 40 or the self-service checkout machine 50. The processor 31 determines whether or not a predetermined condition for permission is satisfied. Then, if the condition for permission is satisfied, the processor determines that the through-checkout is permitted, determines YES, and the process proceeds to ACT 32.

The condition for permission may be any condition prescribed by the developer of the transaction processing program AP1 or the administrator of the virtual POS server 30. It is assumed in this non-limiting example that the condition for permission for "through-checkout" is the following conditions apply: there is no need to print a certificate and a commodity with an age restriction is not included in a registered commodities. Alternatively, the condition(s) for permission may be considered satisfied if the customer M1 is pre-registered as a member of an electronic receipt service or the like.

(1) A Case where there is a Need to Pass a Certificate to the Customer M1

A certificate is a receipt, proof of purchase, warranty, coupon, discount voucher, or other. Such a certificate is typically printed at the time of checkout by the printer 50*a* provided in the manned checkout machine 40 or the self-service checkout machine 50. In some instances, the certificate may be a printed matter prepared in advance. The certificate may need to be formed by writing some information by hand on paper prepared in advance by the clerk. Receipts are supposed to be, in principle, issued for all transactions. However, when the customer M1 is a member of the electronic receipt service, the issuance of a physical receipt can be omitted by using the electronic receipt service. In the present embodiment, if the customer M1 is not a member of the electronic receipt service, this corresponds to a case where a certificate needs to be passed to the customer M1 for completion of the sales transaction. For this condition, for example, if a valid electronic receipt ID is not set in the field F44 of the data record DR4 associated with the cart terminal 10, the processor 31 determines that the certificate needs to be passed to the customer M1. For example, if any of the commodity data included in the data record DR5 associated with the transaction related to the cart terminal 10 includes issuance confirmation information including flag information indicating whether a certificate needs to be issued, the processor 31 determines that a certificate needs to be passed to the customer M1.

(2) A Case where a Commodity that Requires the Clerk M2 to Respond is Included in the Registered Commodities In this case, the response by the clerk M2 is, for example, to determine whether or not the customer M1 meets a restriction limitation when the registered commodities include a commodity with a restriction such as a customer age restriction. The response by the clerk M2 can be, for example, to provide required or desirable explanations and/or warnings related to uses or functions of an item being purchased that need to be explained by a qualified person to the customer M1 at the time of purchase. The response by the clerk M2 can be, for example, to hand over an additional item or reward to the customer M1 when the registered commodities include a commodity for which the such an additional item or reward is to be awarded with purchase(s). The response by the clerk M2 is, for example, that the clerk M2 verbally gives an explanation about the commodity to the customer M1. For this condition, for example, if any of the commodity data included in the data record DR5 associated with the transaction related to the cart terminal 10 includes the issuance confirmation information including the flag information indicating that the clerk needs to confirm or provide additional information when selling the item, the processor 31 determines that a commodity requiring the clerk M2's response is included in the registered commodities.

(3) A Case where there is a Possibility that a Commodity that Needs to be Confirmed by the Clerk M2 is Placed on the Cart C The confirmation by the clerk M2 in this case is, for example, a confirmation of products in the cart C when there is a possibility that a commodity has been placed in the cart C without being registered.

(4) A Case where a Settlement Method that Requires the Clerk to Respond is Selected The settlement method that requires the clerk's response is, for example, a settlement method that is not allowed to be handled at the self-service checkout machine 50 as in the case of settlement using a gift certificate, and is prescribed to be performed by the clerk. The case where the corresponding settlement method is selected as a default settlement method for the customer M1 is an example of the above case. Alternatively, the case where the corresponding settlement method is selected as a settlement method for a commodity to be registered before the registration of the commodity is completed is an example of the above case.

As ACT 32, the processor 31 instructs the cart terminal 10 to display a registration screen. The registration screen is a screen that represents a list of registered commodities.

FIG. 16 is a diagram illustrating an example of a registration screen SC11.

The registration screen SC11 shows areas AR1, AR2, and AR3, buttons BU1, BU2, and BU3, and an icon IC1. The area AR1 shows the commodity names of the commodities shown in the commodity list after being updated in ACT 28 or ACT 30, arranged in the row direction. The area AR1 is also arranged in the column direction with respect to the above-described commodity names and represents the number of pieces of commodities registered as a registered commodity and a selling price of the commodity. In the area AR1, a strikethrough is attached to the commodity name, the number of pieces, and selling price of the commodity that is displayed in the commodity list but in a state indicating that the cancellation flag has been performed. In other words, the registration screen SC11 shows a state in which commodities whose commodity names are "AAA", "BBB", "DDD" and "EEE" are registered commodities, and a commodity whose commodity name is "CCC" is once a registered commodity but has already been canceled.

The area AR2 is arranged in each row of the area AR1. Although not illustrated in FIG. 16, in the area AR2, icons corresponding to the associated commodities are displayed as necessary. The icon displayed in the area AR2 indicates, for example, a commodity that is a target commodity for various types of price cuts such as a set discount, an age-restricted commodity, and the like.

The area AR3 represents the total number of pieces and the total amount of the registered commodities. The processor 31 displays the amount calculated in ACT 28 or ACT 30 as a total amount in the area AR3.

The button BU1 is arranged side by side with the row representing the commodity among the rows of the area AR1. The button BU1 is an operation button for the operator to instruct a cancellation of the registered commodity displayed side by side. That is, when the button BU1 is touched and the fact is notified from the cart terminal 10 to the virtual POS server 30, the processor 31 determines that the cancellation has been instructed in ACT 29.

The button BU2 is an operation button for the operator to instruct to complete the registration of the commodity and proceed to checkout.

The button BU3 is an operation button for the operator to instruct to shift to an operation screen for registering a commodity without a code symbol as a registered commodity.

The icon IC1 is an icon for notifying the customer M1 that through-checkout is permitted.

The processor 31 generates screen data of the registration screen SC11 in which information based on the commodity list updated in ACT 28 or ACT 30 is displayed in areas AR1, AR2, and AR3 and transmits this screen data to the cart terminal 10. Then, in the cart terminal 10, the processor 11*a* displays the registration screen SC11 on the touch panel 11*e* based on the screen data.

On the other hand, if the predetermined condition for permission is not satisfied, the processor 31 determines NO in ACT 31, and the process proceeds to ACT 33.

As ACT 33, the processor 31 instructs the cart terminal 10 to display the registration screen SC11. However, the processor 31 does not display the icon IC1 on the registration screen SC11 generated by ACT 33.

On the registration screen SC11, the information displayed in the areas AR1, AR2, and AR3, the display state of the button BU1, and the presence or absence of the icon IC1 can change from the state illustrated in FIG. 16, and other display elements do not change in principle.

Then, the processor 31 changes whether or not to display the icon IC1 on the registration screen SC11 according to whether or not the through-checkout is permitted.

After completing ACT 32 or ACT 33, the processor 31 returns to the standby state of ACT 24 to ACT 26 in FIG. 12.

(Replacement of Cart C) The customer M1 as a member can change carts C when the remaining battery level of the cart C presently in use is low. In this case, the customer M1 performs a use start operation on the new cart C that is different from the cart C already in use. Any new cart C can be used as long as it is not being used by another customer M1.

When a login request in response to the use start operation is notified from the cart terminal 10 (here, referred to as the new terminal 10) of the cart C to the virtual POS server 30, the processor 31 starts information processing for the new terminal 10. At this time, the member code included in the notification data of the login request matches the member code set in the field F42 of the data record DR4 associated with the cart terminal 10 (here, referred to as the old terminal 10) of the cart C in use. Therefore, the processor 31 determines YES in ACT 20 of the information processing for the new terminal 10 and the process proceeds to ACT 34.

As ACT 34, the processor 31 updates the cart management database DB1. For example, the processor 31 finds the data record DR4 in which the member code set in the field F42 matches the member code included in the notification data of the login request, from the data records DR4 included in the cart management database DB1. Then, the processor 31 rewrites the terminal code set in the field F41 of the corresponding data record DR4 to the terminal code of the new terminal 10. As a result, the commodity list that has been an update target in the information processing related to the old terminal 10 is inherited as an update target in the information processing related to the new terminal 10. Then, when the update is completed, the processor 31 notifies the new terminal 10 of the completion of the login.

As ACT 35, the processor 31 instructs the new terminal 10 to display the screen which is being displayed on the touch panel 11e on the old terminal 10. Thereafter, the processor 31 shifts to the standby state of ACT 24 to ACT 26.

Thereafter, the customer M1 can continue to register a commodity by using the new terminal 10.

In this case, the processor 31 remains in the standby state of ACT 24 to ACT 26 in the information processing for the old terminal 10. In this case, upon receiving any notification from the old terminal 10, the processor 31 determines that there no data record DR4 associated with the old terminal 10, and then ends the information processing for the old terminal 10.

(Checkout)

When the customer M1 registers all the commodities to be purchased as registered commodities, the customer M1 moves to the checkout zone ZO1. When the cart terminal 10 enters the receivable range of the beacon signal transmitted by the beacon transmitter 60, the beacon receiver 15 receives the beacon signal. Then, when the beacon receiver 15 notifies the processor 11a of the fact, the processor 11a determines YES in ACT 5 in FIG. 11 and the process proceeds to ACT 9.

As ACT 9, the processor 11a notifies the virtual POS server 30 of the reception of the beacon. Then, the processor 11a thereafter returns to the standby state of ACT 3 to ACT 6.

When the beacon reception is notified to the virtual POS server 30 in this way, the processor 31 determines YES in ACT 25 in FIG. 12 and the process proceeds to ACT 36.

As ACT 36, the processor 31 instructs the cart terminal to display a first confirmation screen. The first confirmation screen is a screen for selecting whether or not to start the checkout. The first confirmation screen represents, for example, a button for selecting to start checkout and a button for selecting to return to the sales floor and continuing to register a commodity. Thereafter, the processor 31 returns to the standby state of ACT 24 to ACT 26.

The cart terminal 10 displays the first confirmation screen on the touch panel 11e in response to the above instruction. The customer M1 instructs on the first confirmation screen whether to start checkout or to return to the sales floor and continue to register a commodity. Then, in response to the instruction, the cart terminal 10 notifies the virtual POS server 30 of the selection on the first confirmation screen.

Figure 14:
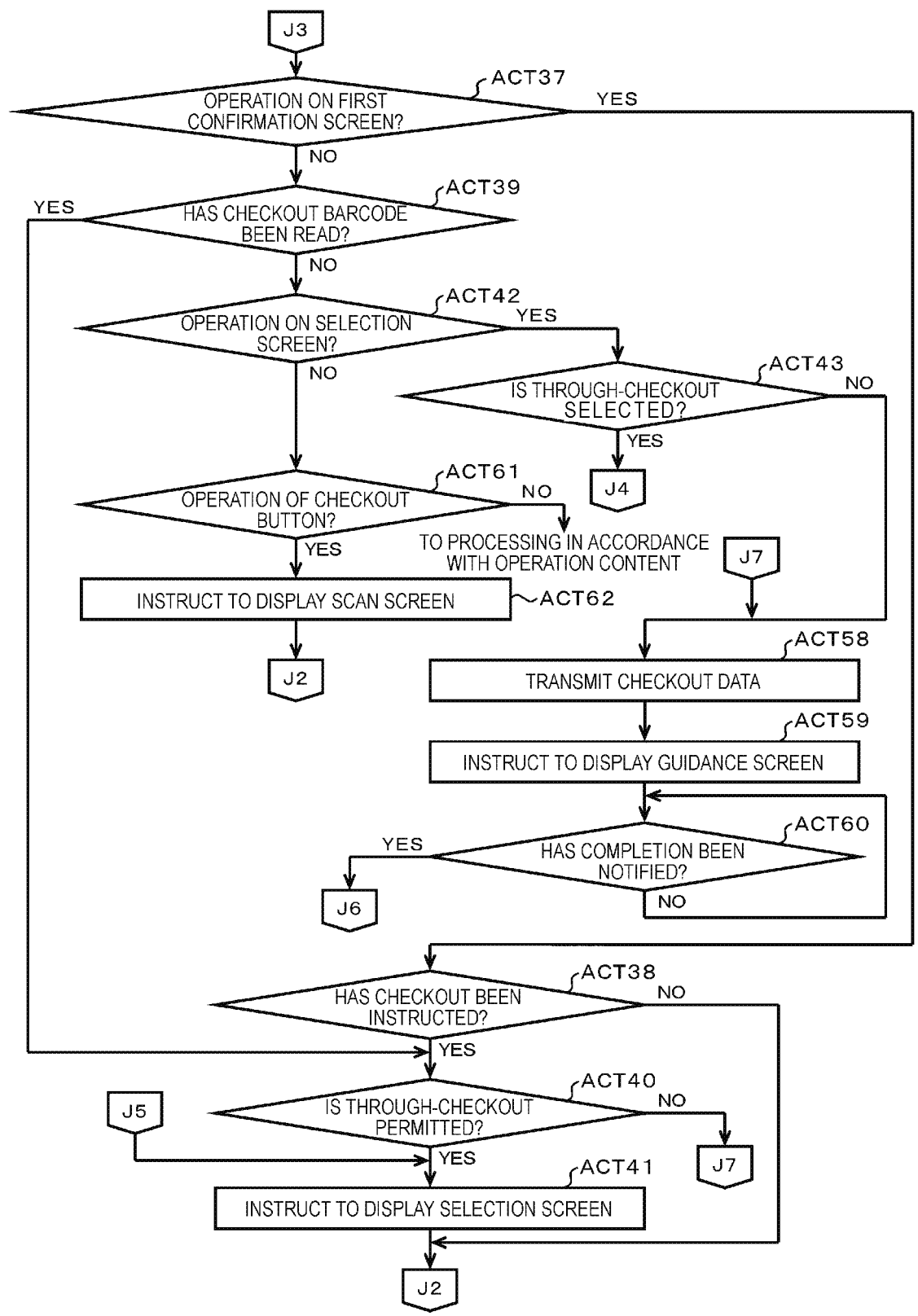

When the selection on the first confirmation screen is notified in this way, the processor 31 determines YES in ACT 24 in FIG. 12, and NO in ACT 27 and ACT 29 in FIG. 13, and the process proceeds to ACT 37 in FIG. 14.

As ACT 37, the processor 31 determines whether or not the selection on the first confirmation screen has been notified. The processor 31 determines YES in the above case, and the process proceeds to ACT 38.

As ACT 38, the processor 31 determines whether or not the instruction has been made to start the checkout. Then, if the instruction is made to continue the registration of a commodity, the processor 31 determines NO and returns to the standby state of ACT 24 to ACT 26 in FIG. 12. At this time, the processor 31 does not determine YES in ACT 25 until a predetermined time elapses after returning to the standby state of ACT 24 to ACT 26. Accordingly, even if the instruction to continue the registration of a commodity on the first confirmation screen is issued while the customer M1 is in the checkout zone ZO1, the reception of the beacon for a while thereafter is ignored.

By the way, in the period in which beacon reception is ignored as described above, if the customer M1 again wants to start checkout, for example, as illustrated in FIG. 2, the scanner 12 of the cart terminal 10 reads the checkout barcode BC1 installed in the checkout zone ZO1. Even if the beacon receiver 15 does not receive a beacon signal due to some kind of failure and the first confirmation screen is not displayed even when moving into the checkout zone ZO1, the customer M1 operates the scanner 12 of the cart terminal 10 to read the checkout barcode BC1. In response, the cart terminal 10 notifies the virtual POS server 30 that the scanner 12 has been operated, along with the notification of the checkout barcode.

In this case, the processor 31 determines YES in ACT 24 in FIG. 12, and NO in ACT 27 and ACT 29 in FIG. 13 and ACT 37 in FIG. 14, respectively, and the process proceeds to ACT 39.

As ACT 39, the processor 31 determines whether or not the checkout barcode has been read. Then, the processor 31 determines YES if the operation of reading the checkout barcode is notified as described above, and the process proceeds to ACT 40. When the start of checkout is instructed on the first confirmation screen, the processor 31 determines YES in ACT 38 and the process proceeds to ACT 40.

As ACT 40, the processor 31 determines whether or not the through-checkout is permitted in the same manner as in ACT 31. Then, if the through-checkout is permitted, the processor 31 determines YES and the process proceeds to ACT 41.

As ACT 41, the processor 31 instructs the cart terminal 10 to display a selection screen. The selection screen is a screen for the customer M1 to select whether or not to apply the through-checkout. Thereafter, the processor 31 returns to the standby state of ACT 24 to ACT 26 in FIG. 12.

FIG. 17 is a diagram illustrating an example of a selection screen SC12.

The selection screen SC12 shows an area AR21, buttons BU21, BU22, BU23, and a message ME21. The area AR21 represents the amount to be settled by the customer M1. The button BU21 is an operation button for the operator to select the through-checkout. The button BU22 is an operation button for the operator to select the use of self-service checkout machine 50. The button BU23 is an operation button for the operator to instruct to return the display on the cart terminal 10 to the screen displayed before displaying the selection screen SC12. The message ME21 is a text message that guides the operator to select, with the button BU21 or the button BU22, whether to perform the checkout at the cart terminal 10 by applying the through-checkout or to perform the checkout by using the self-service checkout machine.

On the selection screen SC12, the amount shown in the area AR21 can change from the state illustrated in FIG. 17 according to the registration status of the registered commodity, and other display elements do not change in principle.

The cart terminal 10 displays the selection screen SC12 on the touch panel 11*e* according to the above instruction. The customer M1 instructs on the selection screen SC12 whether to apply through-checkout or use the self-service checkout machine 50. Then, in response to the instruction, the cart terminal 10 notifies the virtual POS server 30 of the selection on the selection screen SC12. That is, the processor 11*a* selects whether to apply the through-checkout or use the self-service checkout machine 50 according to the operation of the customer M1.

When the selection on the selection screen SC12 is notified as described above, the processor 31 determines YES in ACT 24 in FIG. 12, determines NO in ACT 27 and ACT 29 in FIG. 13 and ACT 37 and ACT 39 in FIG. 14, respectively, and the process proceeds to ACT 42.

As ACT 42, the processor 31 determines whether or not the selection on the selection screen SC12 has been notified. The processor 31 determines YES in the above case and the process proceeds to ACT 43.

As ACT 43, the processor 31 determines, based on the notification from the cart terminal 10, whether or not the through-checkout is selected. Then, the processor 31 determines YES if the through-checkout is selected, and the process proceeds to ACT 44 in FIG. 15.

As ACT 44, the processor 31 requests the settlement server 3 for settlement. Specifically, the processor 31 instructs the cart terminal 10 to display a selection screen, for example. The selection screen is a screen for the operator to select a payment method to be used in the through-checkout.

Figure 18:
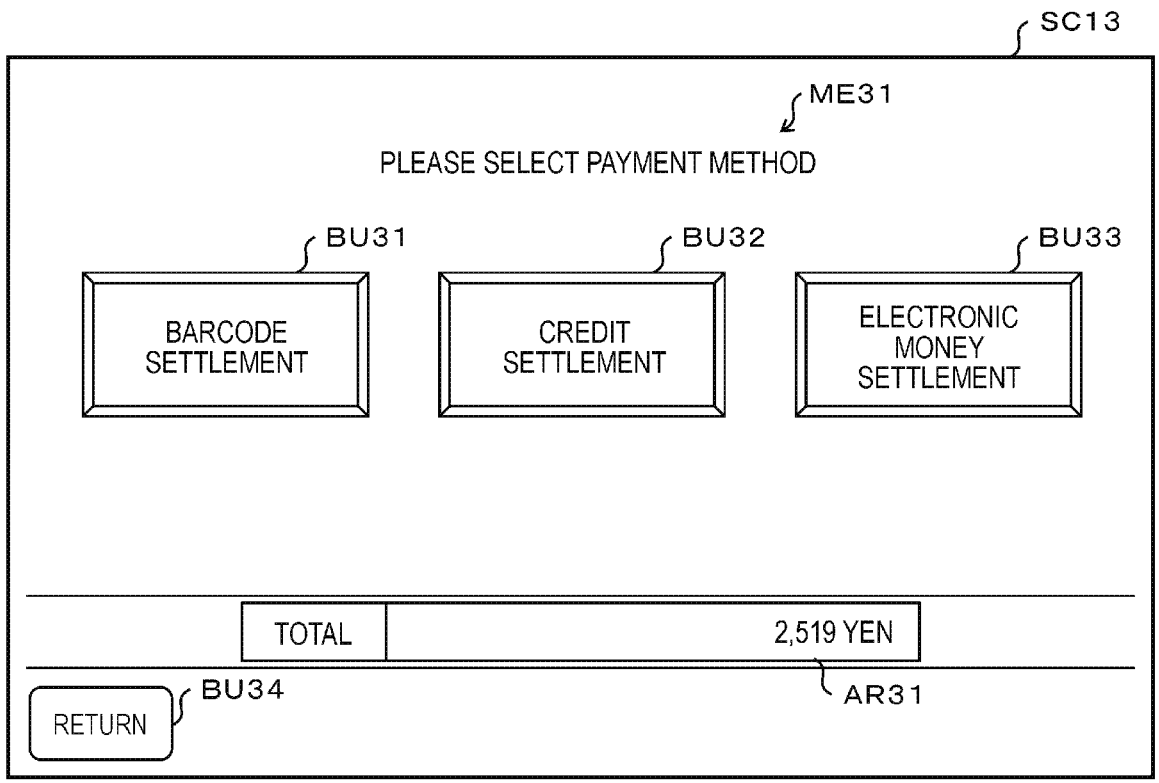
FIG. 18 is a diagram illustrating an example of a designation screen according to an embodiment.

FIG. 18 is a diagram illustrating an example of a selection screen SC13.

The selection screen SC13 shows an area AR31, buttons BU31, BU32, BU33, and BU34, and a message ME31. The area AR31 indicates the amount to be settled by the customer M1. The button BU31 is an operation button for the operator to select barcode settlement as a payment method to be used. The button BU32 is an operation button for the operator to select credit settlement as a settlement method to be used. The button BU33 is an operation button for the operator to select electronic money settlement as a settlement method to be used. The button BU34 is an operation button for the operator to instruct to return the display on the cart terminal 10 to the screen displayed before displaying the selection screen SC13. The message ME31 is a text message that guides the operator to select a settlement method by using the buttons BU31, BU32, and BU33.

On the selection screen SC13, the amount shown in the area AR31 can change from the state illustrated in FIG. 18 according to the registration status of the registered commodity, and other display elements do not change in principle.

The cart terminal 10 displays the selection screen SC13 on the touch panel 11*e* according to the above instruction. The customer M1 selects the settlement method on the specification screen SC13. Then, in response, the cart terminal 10 notifies the virtual POS server 30 of the selected settlement method.

When notified of the selected settlement method from the cart terminal 10, the processor 31 instructs the cart terminal 10 to display a settlement screen corresponding to the notified settlement method. The settlement screen is a screen for guiding the operator to perform settlement.

Figure 19:
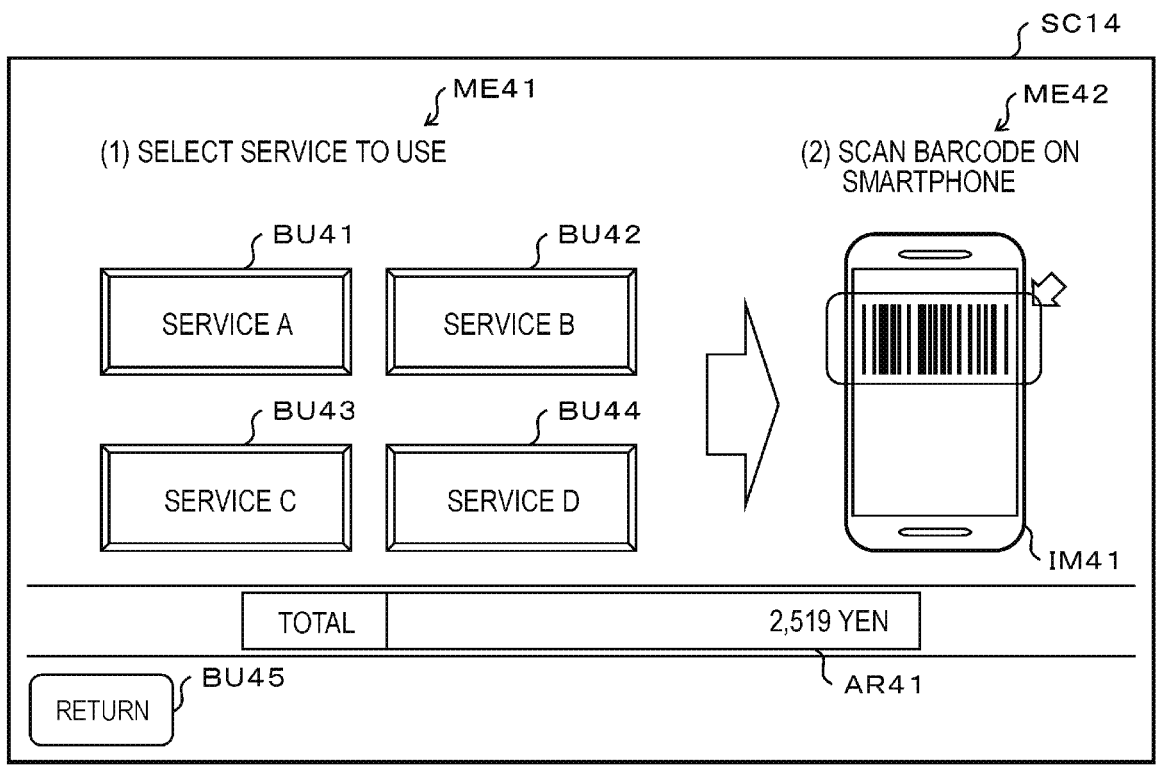
FIG. 19 is a diagram illustrating an example of a settlement screen when barcode settlement is selected in an embodiment.

FIG. 19 is an example of a settlement screen SC14 when barcode settlement is selected.

The settlement screen SC14 shows an area AR41, buttons BU41, BU42, BU43, and BU44, BU45, messages ME41 and ME42, and an image IM41. The area AR41 indicates the amount to be settled by the customer M1. The buttons BU41 to BU44 are operation buttons for the operator to select the barcode settlement service to be used. The buttons BU41 to BU44 are associated with available barcode settlement services, respectively. The button BU45 is an operation button for the operator to instruct to return the display on the cart terminal 10 to the screen displayed before displaying the settlement screen SC14. The message ME41 is a text message that guides the operator to select which barcode settlement service to use by using the buttons BU41, BU42, BU43, and BU44. The message ME42 is a text message that guides the operator to scan the settlement barcode displayed on the smartphone possessed by the customer M1. The image IM41 is an image for guiding a barcode to be scanned in combination with the message ME42 to the operator.

On the settlement screen SC14, the amount shown in the area AR41 can change from the state illustrated in FIG. 19 according to the registration status of the registered commodity, and other display elements do not change in principle.

The settlement screen SC14 is an example of a case where four barcode settlement services are permitted to be used. The number of buttons corresponding to the buttons BU1 to BU4 is changed in accordance with the number of barcode settlement services permitted to be used. If only one barcode payment service is permitted to be used, the buttons corresponding to the buttons BU1 to BU4 are not displayed on the settlement screen SC14.

The cart terminal 10 displays the settlement screen SC14 on the touch panel 11*e* according to the above instruction. The customer M1 selects the barcode settlement service to be used by operating any of the buttons BU41 to BU44. The customer M1 causes the scanner 12 to read the settlement barcode displayed on the smartphone by the application software for the barcode settlement service to be used. In response, the processor 11a in the cart terminal 10 notifies the virtual POS server 30 of a settlement method code for identifying barcode settlement from other settlement methods, a service code for identifying the selected barcode settlement service from other services, and settlement data represented by the settlement barcode. If only one barcode settlement service is permitted to be used, the processor 11a may notify the virtual POS server 30 of the service code of the one barcode settlement service, or may omit the notification of the service code.

In the case of credit settlement, data such as a credit card number recorded on a credit card is data for settlement. When credit settlement is selected, the processor 11a notifies the virtual POS server 30 of a settlement method code for identifying credit settlement from other settlement methods and a credit card number read by the reader 13 from the credit card.

In the case of electronic money settlement, data such as an electronic money ID recorded on an electronic money card is data for settlement. If electronic money settlement is selected, the processor 11a notifies the virtual POS server 30 of a settlement method code for identifying the electronic money settlement from other settlement methods and an electronic money ID read by the reader 13 from the electronic money recording medium. If a plurality of electronic money settlement services is permitted to be used, the processor 11a receives the electronic money settlement service selected by the customer M1 on a screen similar to the selection screen SC12 and also notifies the virtual POS server 30 of the service code of the selected electronic money settlement service. If only one electronic money settlement service is permitted to be used, the processor 11a may notify the virtual POS server 30 of the service code of the one electronic money settlement service, or may omit the notification of the service code.

If the credit card number or the electronic money ID is stored in the settlement server 3 or the virtual POS server 30 in association with the management code, and the management code is notified to the payment server 3 or the virtual POS server 30 when settlement is requested, the management code becomes settlement data.

When the processor 31 receives the notification from the cart terminal 10 as described above, the processor 31 requests the settlement server 3 for the settlement along with the notification of the settlement data. The processor 31 sets the total price most recently calculated in ACT 28 or ACT 30 in FIG. 13 as the settlement amount for which settlement is requested here.

When the settlement server 3 supports each settlement method, the processor 31 also notifies the settlement method code to the settlement server 3 when requesting settlement. When the settlement server 3 supports each settlement service, the processor 31 also notifies the settlement server 3 of the service code when requesting the settlement. If there are a plurality of settlement servers 3 depending on the settlement method or a plurality of settlement servers depending on the settlement service, the processor 31 selects a settlement server 3 corresponding to the settlement method and the settlement service to be used based on the settlement method code and the service code notified from the cart terminal 10 and requests the settlement server 3 for settlement.

When the processor 31 executes the information processing based on the transaction processing program AP1, the computer having the processor 31 as a central part functions as a requesting unit.

When the settlement is requested, the settlement server 3 determines whether or not the settlement according to the request is possible. Then, if the settlement is possible, the settlement server 3 executes processing for settlement according to the request. Then, when the settlement server 3 has completed the settlement, the settlement server 3 sends a result code indicating the completion to the virtual POS server 30. If the settlement server 3 cancels the processing for settlement for some reason, the settlement server 3 sends a result code indicating the failure to the virtual POS server 30. When the settlement processing has been normally performed but it is unknown whether or not the settlement is completed, the settlement server 3 sends a result code indicating incompletion status to the virtual POS server 30. The other details of the processing in the settlement server 3 described above may be the same as the processing in an existing type settlement server.

Figure 15:
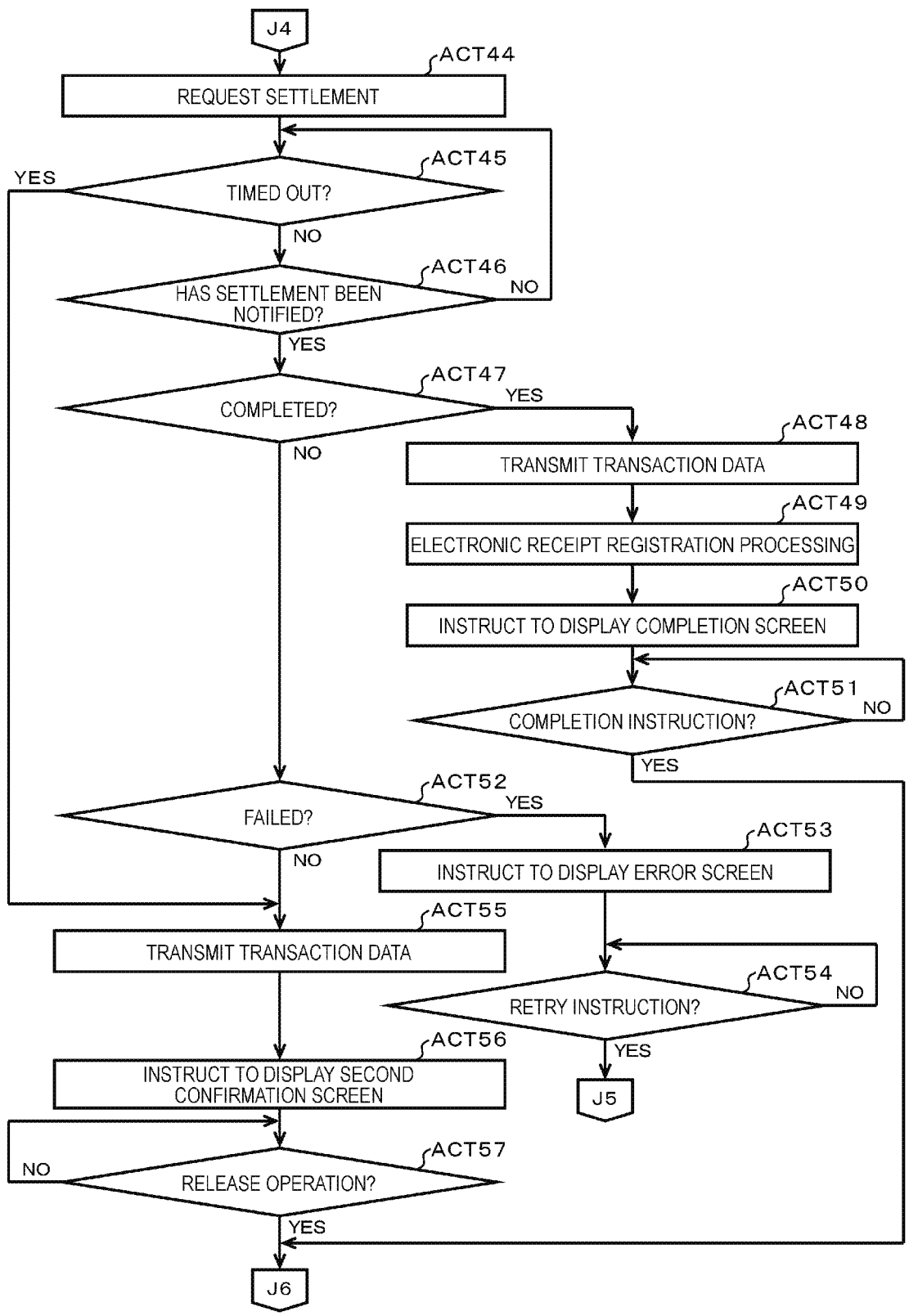

After requesting the settlement in ACT 44 in FIG. 15, the processor 31 in the virtual POS server 30 shifts to the standby state of ACT 45 and ACT 46.

As ACT 45, the processor 31 determines whether or not the standby state has timed out. If the timeout has not occurred, the processor 31 determines NO and the process proceeds to ACT 46.

As ACT 46, the processor 31 determines whether or not the settlement server 3 has notified the settlement result yet. Then, if the corresponding notification has not been sent (or is not confirmed as sent), the processor 31 determines NO and the process returns to ACT 45.

In the standby state of ACT 45 and ACT 46, the processor 31 waits for timeout or notification of the result.

Then, when the result code transmitted from the settlement server 3 is received by the communication interface 34, the processor 31 determines that the result has been notified, determines YES in ACT 46, and the process proceeds to ACT 47.

As ACT 47, the processor 31 determines whether or not the settlement has been completed. The processor 31 determines YES if the received result code indicates completion, and the process proceeds to ACT 48.

As ACT 48, the processor 31 transmits the transaction data to the store server 20. In this context, transaction data is data related to the transaction being processed. The processor 31 includes first identification data (e.g., first identifier) and second identification data (e.g., second identifier) in the transaction data. The first identification data is data for identifying a particular condition request to the settlement server 3 for the settlement of the transaction from other condition requests received by the settlement server 3. When making a request (settlement request) to the settlement server 3 for settlement, if the requesting virtual POS server 30 notifies the settlement server 3 of an identification code for identifying a settlement condition related to the settlement request, the identification code can be used as the first identification data. Alternatively, data that does not overlap between request conditions to the settlement server 3, such as a combination of an identification code for identifying the virtual POS server 30 in the settlement server 3, a date and time of the settlement request, and a settlement amount, can be used as the first identification data. The second identification data is data for identifying the particular transaction data from other transaction data included in the journal database. As the second identification data, for example, a combination of a transaction code, a cash register code, and a date is used. The cash register code is a code for identifying each POS terminal realized by cooperation between the cart terminal 10 and the virtual POS server 30. As the cash register code, a terminal code may be used, or may be prescribed separately from the terminal code. The processor 31 may also include settlement data for settling the transaction in the transaction data. The settlement data is, for example, at least one of a commodity code and the number of registered commodities, and a settlement amount. The processor 31 may include any data related to the transaction, such as the member code, the date and time, the settlement method, and the settlement processing code, in the settlement data.

Upon receiving the transaction data, the store server 20 updates the journal database to include the transaction data. The journal database is a database including the history of past transactions. The journal database is stored in, for example, the storage device 20a.

The processor 31 outputs the transaction data to be stored in the storage device 20a as a storage device. That is, when the processor 31 executes information processing based on the transaction processing program AP1, the computer having the processor 31 as a central part functions as an output unit.

As ACT 49, the processor 31 performs processing for registering the electronic receipt data related to the transaction for which the settlement has been completed as described above in the electronic receipt server 4 so that the customer M1 can view the electronic receipt data. This processing may be the same as the processing performed by the existing electronic receipt service.

As ACT 50, the processor 31 instructs the cart terminal 10 to display a completion screen. The completion screen is a screen for notifying the operator that the settlement has been completed.

The cart terminal 10 displays a completion screen on the touch panel 11e according to the above instruction. When the customer M1 confirms on the completion screen that the settlement has been completed, the customer M1 instructs to end the use of the cart terminal 10 by, for example, operating a button displayed on the completion screen. In response, the processor 11a in the cart terminal 10 notifies the virtual POS server 30 that the end instruction has been issued.

After the processor 31 instructs the virtual POS server 30 to display the completion screen, the process proceeds to ACT 51.

As ACT 51, the processor 31 waits for a completion instruction. Then, if the completion instruction has been issued from the cart terminal 10 as described above, the processor 31 determines YES and the process proceeds to ACT 65 in FIG. 12.

On the other hand, if the received result code does not indicate completion, the processor 31 determines NO in ACT 47 and the process proceeds to ACT 52.

As ACT 52, the processor 31 determines whether or not the settlement has failed. If the received result code indicates a failure, the processor 31 determines YES and the process proceeds to ACT 53.

As ACT 53, the processor 31 instructs the cart terminal 10 to display an error screen. The error screen is a screen for notifying the operator that the settlement has failed.

The cart terminal 10 displays an error screen on the touch panel 11e according to the above instruction. Upon confirming that the settlement has failed on the error screen, the customer M1 instructs retry of the settlement by, for example, operating a button displayed on the error screen.

Then, in response, the processor 11a in the cart terminal 10 notifies the virtual POS server 30 that a retry instruction has been issued.

After the processor 31 instructs the virtual POS server 30 to display an error screen, the process proceeds to ACT 54.

As ACT 54, the processor 31 waits for a retry instruction. Then, the processor 31 determines YES if the retry instruction has been issued from the cart terminal 10 as described above, and the process returns to ACT 41 in FIG. 14. That is, the processor 31 returns the cart terminal 10 to a state in which the selection screen SC12 is displayed on the touch panel 11e and repeats the subsequent processing as described above. The process may return to ACT 44 in FIG. 15.

If the received result code indicates incompletion, the processor 31 determines NO in both ACT 47 and ACT 52 in FIG. 15 and the process proceeds to ACT 55.

The state in which the result code is not received is also a state in which it is unknown whether or not the settlement is completed. When the standby state of ACT 45 and ACT 46 times out, the processor 31 determines YES in ACT 45 and the process proceeds to ACT 55.

That is, when the incompletion is notified from the settlement server 3 and when the timeout occurs without receiving the result code, the processor 31 detects that it is unknown whether or not the settlement has been completed. When the processor 31 executes the information processing based on the transaction processing program AP1, the computer having the processor 31 as a central part functions as a detection unit.

The processor 31 transmits the transaction data to the store server 20, as ACT 55. The transaction data transmitted here may be the same data as the transaction data transmitted in ACT 48. However, the transaction data transmitted here includes data indicating that settlement has not been completed.

As ACT 56, the processor 31 instructs the cart terminal 10 to display the second confirmation screen. The second confirmation screen is a screen for the clerk M2 to perform a confirmation operation related to the settlement that has not been completed.

Figure 20:
FIG. 20 is a diagram illustrating an example of a second confirmation screen according to an embodiment.

FIG. 20 is a diagram illustrating an example of a second confirmation screen SC15.

The second confirmation screen SC15 shows a code symbol CS51, a message ME51, and a button BU51. The code symbol CS51 represents the second identification data included in the transaction data transmitted in ACT 55. In the example of FIG. 20, a barcode is used as a code symbol. The message ME51 is a text message that guides the customer M1 that it is necessary to offer to the clerk M2 to confirm the settlement status. The button BU51 is an operation button for the clerk M2 to instruct to cancel the state in which the second confirmation screen SC15 is displayed.

On the second confirmation screen SC15, the code symbol CS51 can change from the state illustrated in FIG. 20 according to the identification data, and other display elements do not change in principle.

Displaying the second confirmation screen SC15 corresponds to outputting the second identification data represented by the code symbol CS51. Thus, instructing the cart terminal 10 to display the second confirmation screen is the same as instructing to output the second identification data. That is, when the processor 31 executes information processing based on the transaction processing program AP1, the computer having the processor 31 as a central part functions as an instruction unit.

The cart terminal 10 displays the second confirmation screen SC15 on the touch panel 11e according to the above instruction. The customer M1 offers to the clerk M2 according to the guidance by the message ME51. The clerk M2 receiving the offer activates, for example, the journal search function of the manned checkout machine 40 and reads the code symbol CS51 displayed on the touch panel 11e of the cart terminal 10. Upon reading the code symbol CS51, the manned checkout machine 40 determines the second identification data represented by the code symbol CS51. The manned checkout machine 40 acquires the transaction data including the determined second identification data from the store server 20. The manned checkout machine 40 outputs the first identification data included in the acquired transaction data by displaying or printing.

The clerk M2 makes an inquiry to a predetermined inquiry destination by telephone or the like about the status of electronic settlement related to the request condition identified by the first identification data. Then, when the clerk M2 confirms that the settlement is completed, the manned checkout machine 40 performs a predetermined operation for confirming completion of the settlement. Then, the manned checkout machine 40 requests the store server 20 for transaction data that is included in the journal database and includes the second identification data determined above so as to delete the data indicating that the settlement is incomplete or to rewrite the data with data indicating that the settlement is completed. The store server 20 updates the journal database according to this request.

When it is determined that the settlement has not been completed, the clerk M2 operates the manned checkout machine 40 to perform the settlement based on the settlement data included in the acquired transaction data. Then, if the settlement is completed by the processing according to this operation, the manned checkout machine 40 requests the store server 20 to rewrite the transaction data included in the journal database and including the determined second identification data so as to indicate the result of the settlement. The manned checkout machine 40 requests the store server 20 for transaction data that is included in the journal database and includes the second identification data determined above so as to delete the data indicating that the settlement is incomplete or to rewrite the data with data indicating that the settlement is completed. The store server 20 updates the journal database according to these requests.

Among the above operations, the operations up to confirming the settlement status and the operation for re-performing the settlement that has not been completed may be performed by using separate devices. The device used for the above operation may be the clerk terminal 70.

In the virtual POS server 30, the processor 31 causes the cart terminal 10 to display the second confirmation screen SC15 in ACT 56 in FIG. 15, and then shifts to a standby state of ACT 57.

In ACT 57, the processor 31 waits for a release operation to be performed. The release operation is an operation that is determined in advance as being performed by the clerk M2 after the clerk M2 performs the above-described treatment. The release operation is, for example, to operate the button BU51 displayed on the second confirmation screen SC15 along with a hidden operation that the customer M1 does not usually know. When notified that such a release operation has been performed from the cart terminal 10, the processor 31 determines YES and the process proceeds to ACT 65 in FIG. 12.

On the other hand, if the checkout using the self-service checkout machine 50 is instructed, for example, by operating the button BU21 on the selection screen SC12, the processor 31 determines NO in ACT 43 in FIG. 14 and the process proceeds to ACT 58. The process proceeds to ACT 58 also when NO is determined in ACT 40 since through-checkout is not permitted. That is, the process proceeds to ACT 58 in a situation where it is necessary to start checkout with the self-service checkout machine 50.

As ACT 58, the processor 31 transmits the checkout data to the communication network 2 so as to cause one of the self-service checkout machines 50 in a standby state to acquire the checkout data. The processor 31 finds, for example, a self-service checkout machine 50 in a standby state from among the self-service checkout machines 50 and transmits the checkout data to the self-service checkout machine 50. Alternatively, the processor 31 transmits the checkout data to, for example, one of the self-service checkout machines 50 regardless of whether the self-service checkout machine 50 is in a standby state. In this case, the self-service checkout machine 50 to which the checkout data is transmitted accepts the checkout data if in a standby state. However, if not in a standby state, the self-service checkout machine 50 transfers the checkout data to one of the other self-service checkout machines 50. Alternatively, the processor 31 broadcasts the checkout data to a plurality of self-service checkout machines 50, for example. In this case, one of the plurality of self-service checkout machines 50 in a standby state accepts the above-described checkout data. The checkout data may be transmitted by any other method as long as the checkout data is accepted by one self-service checkout machine 50 in a standby state.

The checkout data is data necessary for the self-service checkout machine 50 to settle the transaction for the commodities registered at the cart terminal 10. Specifically, for example, the processor 31 finds the data record DR4 in which the terminal code set in the field F41 matches the terminal code of the cart terminal 10, from the data records DR4 included in the cart management database DB1. Then, the processor 31 acquires the transaction code set in the field F43 of the corresponding data record DR4. Next, the processor 31 finds the data record DR5 in which the transaction code set in the field F51 matches the acquired transaction code, from the data records DR5 included in the registered commodity database DB2. Then, the processor 31 generates checkout data including the data set in each field of the found data record DR4 and the commodity data included in the found data record DR5. The processor 31 may calculate the settlement amount related to the sales of the registered commodities based on the commodity data included in the found data record DR5 and include the settlement amount in the checkout data.

As ACT 59, the processor 31 instructs the cart terminal 10 to display a guidance screen. The guidance screen is a screen for notifying the self-service checkout machine 50 that has accepted the checkout data and guiding the customer M1 to perform checkout using the self-service checkout machine 50.

The cart terminal 10 displays a guidance screen on the touch panel 11e according to the above instruction. According to the guidance on the guidance screen, the customer M1 operates the notified self-service checkout machine 50 to settle the amount for the registered commodity. The operation of the self-service checkout machine 50 in this context may be similar to the operation of a checkout machine in the existing semi-self-service checkout system, for example. Then, upon completing the settlement, the self-service checkout machine 50 notifies the virtual POS server 30 of the completion of the settlement.

As ACT 60, the processor 31 waits for a notification of completion of settlement from the self-service checkout machine 50 that has accepted the checkout data transmitted in ACT 58. Then, when the completion is notified, the processor 31 determines YES and the process proceeds to ACT 65 in FIG. 12.

In some examples, the customer M1 may also find a self-service checkout machine 50 in a standby state and perform a checkout by using the self-service checkout device 50. In this case, the customer M1 first operates the button BU2 displayed on the registration screen SC11. In response, the cart terminal 10 notifies the virtual POS server 30 that the checkout button has been operated.

When notified that the checkout button has been operated in this manner, the processor 31 determines YES in ACT 24 in FIG. 12, determines NO in ACT 27 and ACT 29 in FIG. 13 and ACT 37, ACT 39, and ACT 42 in FIG. 14, respectively, and the process proceeds to ACT 61 in FIG. 14.

As ACT 61, the processor 31 determines whether or not the operation is the operation of the checkout button. The processor 31 determines YES in the above case, and the process proceeds to ACT 62. If the content of the notified operation is not the operation of the checkout button, the processor 31 determines NO in ACT 61 and shifts to the processing according to the operation.

As ACT 62, the processor 31 instructs the cart terminal 10 to display a scan screen. The scan screen is a screen for instructing the self-service checkout machine 50 to acquire accounting data. The processor 31 thereafter returns to the standby state of ACT 24 to ACT 26 in FIG. 12.

Figure 21:
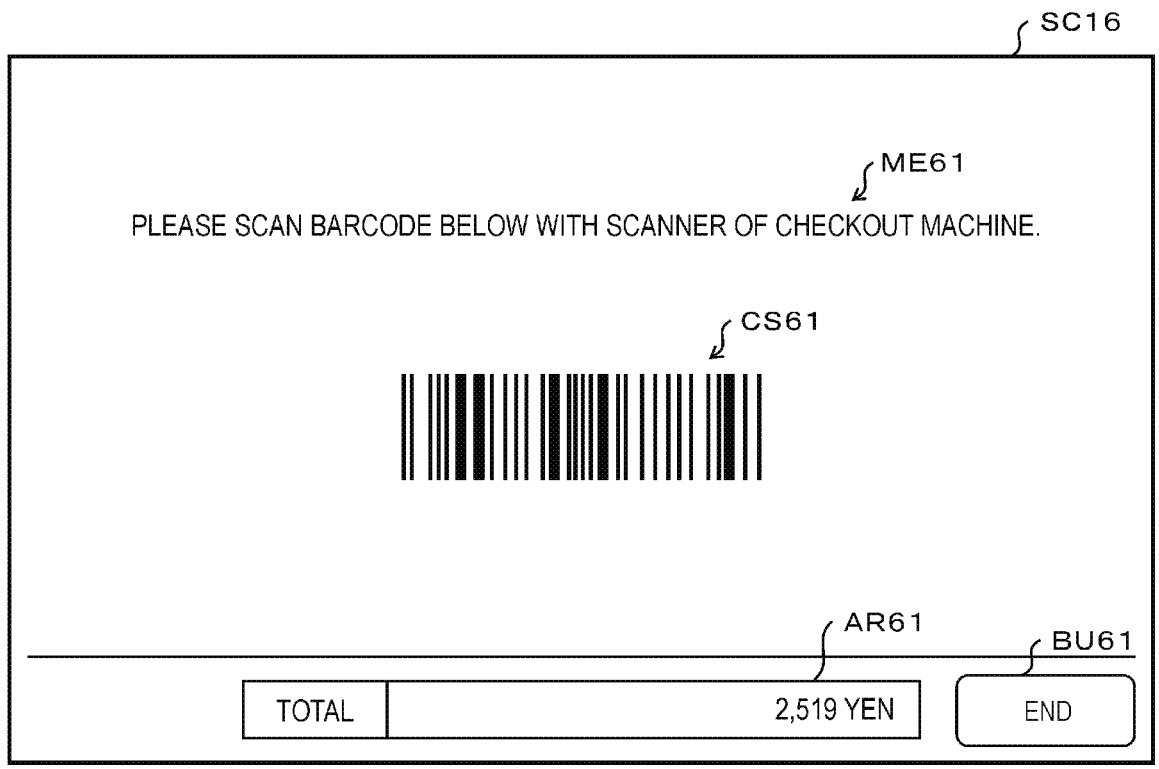
FIG. 21 is a diagram illustrating an example of a scan screen according to an embodiment.

FIG. 21 is a diagram illustrating an example of a scan screen SC16.

The scan screen SC16 shows an area AR61, a code symbol CS61, a message ME61, and a button BU61. The area AR61 represents the amount to be settled by the customer M1. The code symbol CS61 includes data necessary for the self-service checkout machine 50 to acquire checkout data on the cart terminal 10 from the virtual POS server 30. The data included in the code symbol includes, for example, a transaction code. In the example of FIG. 21, a barcode is used as a code symbol. The message ME61 is a text message that guides the operator to scan the code symbol CS61 with the scanner SC2 of the self-service checkout machine 50. The button BU61 is an operation button for the operator to instruct to log off to end shopping.

In the scanning screen SC16, the amount and the code symbol CS61 represented in the area AR61 can change from the state illustrated in FIG. 21 according to the registration status of the registered commodity and the transaction code, and the other display elements do not change in principle.

The cart terminal 10 displays the scan screen SC16 on the touch panel 11*e* according to the above instruction. The customer M1 uses the scanner SC2 of the self-service checkout machine 50 in a standby state to read the code symbol CS61 displayed on the scan screen SC16. When the scanner SC2 reads the code symbol CS61, the self-service checkout machine 50 requests the virtual POS server 30 for checkout data on the cart terminal 10 based on the transaction code included in the code symbol CS61.

The transaction code may be output in a manner different from the display, such as wireless transmission using short-range wireless communication technology (e.g., near-field communication). The read commodity code may be stored in the cart terminal 10, and in this case, the commodity code may be output as information for checkout.

When the checkout data is requested in the virtual POS server 30 in this manner, the processor 31 determines YES in ACT 26 in FIG. 12 and the process proceeds to ACT 63.

As ACT 63, the processor 31 transmits the same checkout data as ACT 58 to the requesting self-service checkout machine 50. The customer M1 operates the self-service checkout machine 50 to settle the amount for the registered commodity. The operation of the self-service checkout machine 50 may be the same as the operation of the checkout machine in the existing semi-self-service checkout system, for example. Then, upon completing the settlement, the self-service checkout machine 50 notifies the virtual POS server 30 of the completion of the settlement.

As ACT 64, the processor 31 waits for a notification of completion of settlement from the self-service checkout machine 50, which is the destination of transmission of the checkout data in ACT 63. Then, when the completion is notified, the processor 31 determines YES and the process proceeds to ACT 65.

The process proceeds to ACT 65 if the completion of the settlement is notified in any of the standby states of ACT 60 in FIG. 14 or ACT 64 in FIG. 12. As described above, the process proceeds from ACT 51 or ACT 57 in FIG. 15 to ACT 65 in FIG. 12.

As ACT 65, the processor 31 executes end processing for ending the transaction that is the target of this information processing. The processor 31 sends, for example, transaction data representing the content of the current transaction to the store server 20. The transaction data represents the details of the transaction, the result of checkout, and the like. The transaction data may be, for example, similar to data stored in an existing POS system for managing ended transactions. For example, the processor 31 deletes the data records DR4 and DR5 included in the cart management database DB1 and the registered commodity database DB2 for a current transaction. That is, the processor 31 deletes the data record DR4 in which the terminal code of the cart terminal 10 is set in the field F41 and the data record DR5 in which the same transaction code as that set in the field F43 of the data record DR4 is set in the field F51, from the cart management database DB1 and the registered commodity database DB2, respectively.

As ACT 66, the processor 31 notifies the cart terminal 10 that logoff is permitted. Then, the processor 31 ends the information processing for the cart terminal 10.

When the processor 11*a* of the cart terminal 10 receives the notification of permitting logoff from the virtual POS server 30, the processor 11*a* determines YES in ACT 6 in FIG. 11 and the process proceeds to ACT 10.

As ACT 10, the processor 11*a* displays a logoff screen on the touch panel 11*e*. The logoff screen is a screen presenting a logoff button for the operator to instruct the logoff.

As ACT 11, the processor 11*a* waits for an operation to log off. Then, for example, when the logoff button is operated, the processor 11*a* determines YES and the process proceeds to ACT 12.

As ACT 12, the processor 11*a* executes logoff processing. The logoff processing is processing for shifting to a standby state that is not in use by the customer M1.

As ACT 13, the processor 11*a* determines whether or not the remaining level of the battery unit 11*j* is low. For example, the processor 11*a* acquires a value of the remaining level measured by the battery unit 11*j* and compares the value of the remaining level with a predetermined threshold. Then, the processor 11*a* determines that the remaining level is low when the value of the remaining level is equal to or smaller than the threshold. Alternatively, the processor 11*a* may determine that the remaining level is low when the value of the remaining level of the battery unit 11*j* is less than the predetermined threshold. The threshold is assumed to be "35%" as an example. However, the threshold may be any other threshold determined by the developer of the transaction processing program AP1 or the administrator of the virtual POS server 30. The threshold is stored in, for example, the auxiliary storage unit 11*c*. Then, if the remaining level of the battery unit 11*j* is low, the processor 11*a* determines YES and the process proceeds to ACT 14.

As ACT 14, the processor 11*a* performs a warning operation. This warning operation is an operation for warning the clerk M2 that the remaining level of the battery unit 11*j* is low. The warning operation is, for example, a notification to the clerk terminal 70. The warning operation is, for example, a display of a predetermined warning screen on the touch panel 11*e*. The warning operation is, for example, a predetermined voice message or warning sound output from the sound unit 11*f*. Only one operation may be performed as the warning operation, or a plurality of operations may be performed in parallel.

In response to the warning operation, the clerk M2 in charge of the maintenance of the cart C replaces the external battery 16 connected to the cart terminal 10 with another charged external battery 16. When the charged external battery 16 is connected to the cart terminal 10, since the power supply unit 11*i* operates with the power supplied from the external battery 16, the cart terminal 10 can operate stably regardless of the remaining level of the battery unit 11*j*. The battery unit 11*j* is charged by the power supplied from the external battery 16. After completing the replacement of the external battery 16, the clerk M2 performs a predetermined release operation on the touch panel 11*e*, for example.

As ACT 15, the processor 11*a* waits for a release operation to be performed. Then, if the release operation is performed as described above, the processor 11*a* determines YES and returns to the standby state of ACT 1. If the remaining level of the battery unit 11*j* is not low, the processor 11*a* determines NO in ACT 13, skips ACT 14 and ACT 15, and returns to the standby state of ACT 1.

As described above, the store system 1 can easily cope with a case where the electronic settlement for the through-checkout has not been completed, as described above.

This embodiment can be modified as follows.

Figure 22:
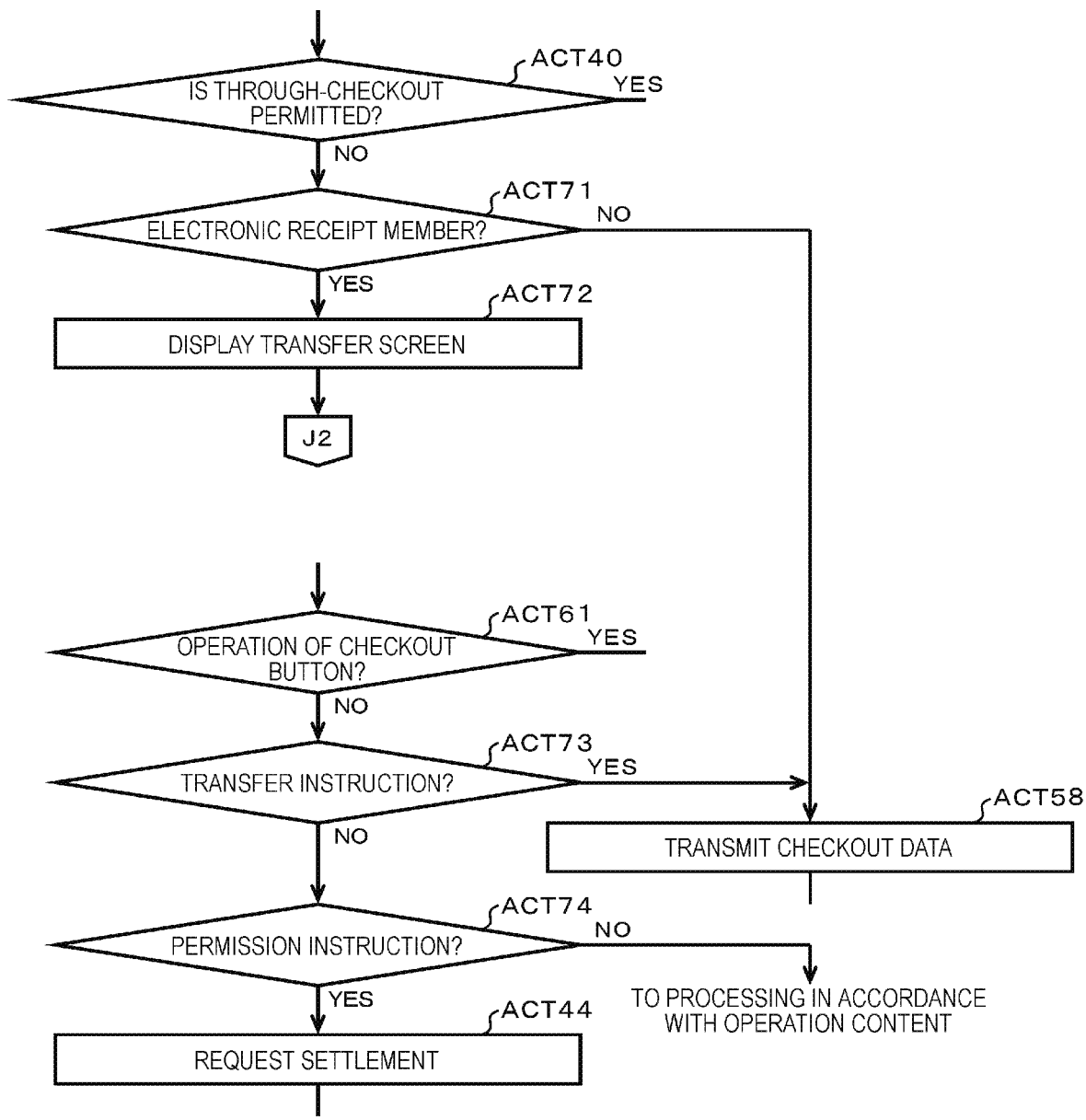
FIG. 22 is a flowchart illustrating a modification of information processing by a processor of a virtual POS server according to an embodiment.

FIG. 22 is a flowchart illustrating a modification example of the information processing by the processor 31. FIG. illustrates only differences from the information processing illustrated in FIGS. 12 to 15, and the same processing as those illustrated in FIGS. 12 to 15 are denoted by the same reference numerals.

If the processor 31 determines NO in ACT 40 because through-checkout is not permitted, the process proceeds to ACT 71.

As ACT 71, the processor 31 determines whether or not the customer M1 is a member of the electronic receipt service. If the customer M1 is not a member of the electronic receipt service, the processor 31 determines NO and the process proceeds to ACT 58. That is, when the customer M1 is not a member of the electronic receipt service, the processor 31 performs the same processing as in the above-described embodiment, except for performing determination in ACT 71.

However, if the customer M1 is a member of the electronic receipt service, the processor 31 determines YES in ACT 71 and the process proceeds to ACT 72.

As ACT 72, the processor 31 instructs the cart terminal 10 to display a transfer screen. The transfer screen is a screen for instructing the customer M1 to transfer the checkout data to the self-service checkout machine 50. The transfer screen additionally indicates that the customer M1 is required to request confirmation from the clerk M2 if the customer wants to perform through-checkout.

The cart terminal 10 displays a transfer screen on the touch panel 11*e* according to the above instruction. If the customer M1 determines to settle with the self-service checkout machine 50 without performing the through-checkout, the customer M1 performs an operation for instructing the transfer of the checkout data to the self-service checkout device 50 on the transfer screen. In response, the cart terminal 10 notifies the virtual POS server 30 that the transfer has been instructed.

When notified that the transfer has been instructed in this manner, the processor 31 determines YES in ACT 24 in FIG. 12, determines NO in ACT 27 and ACT 29 in FIG. 13 and ACT 39 and ACT 42 in FIG. 14, further determines NO in ACT 61, and the process proceeds to ACT 73.

As ACT 73, the processor 31 determines whether or not it is a transfer instruction. The processor 31 determines YES in the above case, and the process proceeds to ACT 58.

On the other hand, if the customer M1 wants to perform through-checkout, the customer M1 requests the clerk M2 to confirm according to the guidance on the transfer screen. In response to this request, the clerk M2 checks a situation in which the through-checkout cannot be permitted and takes measures to resolve the situation. The clerk M2, for example, confirms that the customer M1 matches a restriction when the registered commodities include a commodity with the restriction such as an age restriction on a purchaser. The clerk M2 confirms that, for example, all the commodities placed in the cart C have been registered as registered commodities. In such a case, the clerk M2 performs a special operation for the clerk M2 on the touch panel 11*e*, for example, and issues an instruction to permit the checkout. In response, the cart terminal 10 notifies the virtual POS server 30 that an instruction has been issued to permit the checkout.

If notified that an instruction has been issued to permit the checkout, the processor 31 determines YES in ACT 24 in FIG. 12, determines NO in ACT 27 and ACT 29 in FIG. 13 and ACT 39 and ACT 42 in FIG. 14, respectively, and further determines NO in ACT 61 and ACT 73, respectively, and the process proceeds to ACT 74.

As ACT 74, the processor 31 determines whether or not an instruction has been issued to permit the through-checkout. The processor 31 determines YES in the above case, and the process proceeds to ACT 44. That is, the processor 31 shifts to the processing for through-checkout.

If it is determined that a commodity that is not registered as a registered commodity is placed in cart C, the clerk M2 guides the customer M1 to register the commodity as a registered commodity, or the clerk M2 performs an operation for registering the commodity as a registered commodity with the consent of the customer M1. As a result, if all the commodities placed on the cart C are registered as registered commodities, a situation where through check-out is permitted may occur. Then, when the situation where the through-checkout is permitted is established, the customer M1 can start the through-checkout.

When the clerk M2 confirms that the situation is such that the through-checkout cannot be permitted, the clerk M2 informs the customer M1 of the situation and guides the customer M1 to perform checkout with the self-service checkout machine 50.

As a result, it is necessary to go through the confirmation work by the clerk M2, but if it is possible to permit through-checkout after going through the confirmation, the customer M1 can use the through-checkout.

In addition to the above, the present embodiment can be variously modified as follows.

When NO is determined in ACT 40 or ACT 43 in FIG. 14, the processor 31 may instruct the cart terminal 10 to display the scan screen SC16. Then, in response to a request for checkout data based on the code symbol CS61 displayed on the scan screen SC16, the processing after ACT 63 may be performed.

In this case, the process may proceed to ACT 58 in response to the operation of the button BU2 displayed on the registration screen SC11.

The information processing illustrated in FIGS. 12 to 15 may be executed by the processor 11a in the cart terminal 10. In this case, the cart terminal 10 functions as a transaction processing device. The information processing illustrated in FIGS. 12 to 15 may be shared between and executed by the processor 11a and the processor 31 in conjunction. The processor 11a does not execute processing for managing a plurality of cart terminals 10, such as ACT 20, ACT 34, and ACT 35 in FIG. 12.

The store server 20 or another server may have the function of the virtual POS server 30. The function of the virtual POS server 30 may be performed by distributed processing across a plurality of servers.

A hand-held information terminal, such as a smartphone brought to the store by the customer M1, may be used in place of the cart terminal 10 in some examples.

At least one of the scanner 12, the reader 13, the camera 14, the beacon receiver 15, and the external battery 16 may be appropriately externally provided as optional equipment instead of being a component of the cart terminal 10.

A camera may be built in the tablet computer 11, and the symbol code may be imaged by using the camera. In this case, the processor 11a extracts the commodity code from a barcode image or the like, and therefore the processor 11a functions as an acquisition unit.

Each function performed by the processor 11a or the processor 31 by the information processing can be partially or entirely performed by a dedicated hardware circuit or the like, such as a logic circuit that executes information processing not based on a program. Each of the above functions can also be performed by combining hardware such as the above-described logic circuit with software control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A checkout system, comprising:
   a mobile point-of-sale (POS) apparatus including:
      a code reader;
      a user interface;
      a display;
      a wireless communication interface; and
      a processor configured to control the wireless communication interface to transmit a product code read by the code reader and a settlement instruction based on a user operation on the user interface; and
   a server connectable to the mobile POS apparatus and configured to:
   generate a data record including the product code received from the mobile POS apparatus;
   transmit a settlement request to a settlement server upon receiving the settlement instruction from the mobile POS apparatus;
   upon receiving a settlement non-completion response indicating that a settlement has not been determined to be failed but has not been completed from the settlement server, store transaction data including a first identifier for the settlement request and a second identifier for the transaction data in a database and cause the display of the mobile POS apparatus system to display a code symbol encoding the second identifier; and
   cause the display of the mobile POS apparatus to display an error message after receiving a settlement failure response indicating that the settlement has been determined to be failed from the settlement server.

2. The checkout system according to claim 1, wherein the code symbol does not encode the first identifier.

3. The checkout system according to claim 1, further comprising:
   a fixed POS station including a code reader and configured to retrieve the transaction data when the code reader of the fixed POS station reads the code symbol displayed on the display of the mobile POS apparatus.

4. The checkout system according to claim 1, wherein the server is further configured to cause the display of the mobile POS apparatus to display a settlement completion message after receiving a settlement completion response from the settlement server.

5. The checkout system according to claim 1, wherein the mobile POS apparatus is mounted on a shopping cart.

6. The checkout system according to claim 1, wherein the server is further configured to count the time from transmission of the settlement request until receiving a response from the settlement server and cause the display of the mobile POS apparatus to display the code symbol after the counted time reaches a predetermined threshold.

7. The checkout system according to claim 1, wherein the server is further configured to:
   cause the display of the mobile POS apparatus to display a screen for selecting between a checkout operation at the mobile POS apparatus or a checkout operation at a fixed POS station, and
   transmit the settlement request to the settlement server after the checkout operation at the mobile POS apparatus is selected on the screen.

8. The checkout system according to claim 7, wherein the server is further configured to cause the fixed POS station to transmit a request to the settlement server when the checkout operation at the fixed POS station is selected on the screen.

9. The checkout system according to claim 1, wherein mobile POS apparatus is a hand-held information processing apparatus.

10. A method for performing checkout, comprising:
    transmitting a product code, which has been read by a code reader of a mobile POS apparatus, from the mobile POS apparatus to a server;
    generating a data record including the product code received from the mobile POS apparatus;
    transmitting a settlement instruction based on a user operation performed on the mobile POS apparatus;

transmitting a settlement request from the server to a settlement server after receiving the settlement instruction from the mobile POS apparatus;

upon receiving a settlement non-completion response indicating that a settlement has not been determined to be failed but has not been completed from the settlement server, storing transaction data including a first identifier for the settlement request and a second identifier for the transaction data in a database and displaying a code symbol encoding the second identifier on a display of the mobile POS apparatus; and displaying an error message on the display of the mobile POS apparatus after the server receives a settlement failure response indicating that the settlement has been determined to be failed from the settlement server.

11. The method according to claim 10, wherein the code symbol does not encode the first identifier.

12. The method according to claim 10, further comprising:

reading the code symbol displayed on the display of the mobile POS apparatus with a code reader of a fixed POS station to obtain the second identifier; and sending the transaction data to the fixed POS station after retrieving the transaction data from the database using the second identifier obtained from the reading of the code symbol.

13. The method according to claim 10, further comprising:

displaying a settlement completion message on the display of the mobile POS apparatus after the server receives a settlement completion response from the settlement server.

14. The method according to claim 10, wherein the mobile POS apparatus is mounted on a shopping cart.

15. The method according to claim 10, further comprising:

counting the time from transmission of the settlement request to the settlement server until receiving a response from the settlement server; and displaying the code symbol on the display of the mobile POS apparatus after the counted time reaches a predetermined threshold.

16. The method according to claim 10, further comprising:

displaying a screen on the display of the mobile POS apparatus for selecting between a checkout operation at the mobile POS apparatus or a checkout operation at a fixed POS station, wherein the settlement request is transmitted to the settlement server after the checkout operation at the mobile POS apparatus is selected on the screen.

17. The method according to claim 10, wherein the mobile POS apparatus is a hand-held information processing apparatus.

* * * * *